United States Patent [19]
Matsune et al.

[11] Patent Number: 5,548,578
[45] Date of Patent: Aug. 20, 1996

[54] LAN-TO-LAN COMMUNICATION METHOD, AND LAN-TO-LAN CONNECTING UNIT

[75] Inventors: Hideaki Matsune; Koji Yamato, both of Kawasaki, Japan

[73] Assignee: Fujitsu Limited, Kanagawa, Japan

[21] Appl. No.: 300,793

[22] Filed: Sep. 2, 1994

[30] Foreign Application Priority Data

Nov. 5, 1993 [JP] Japan .................................. 5-276541

[51] Int. Cl.$^6$ ...................................................... H04J 3/14
[52] U.S. Cl. ........................ 370/13; 370/16; 370/85.13; 340/825.08
[58] Field of Search .................................. 370/85.13, 16, 370/16.1, 13, 14, 17, 85.14, 85.1, 85.6, 85.7, 110.1, 54, 77, 79, 85.8; 340/825.06, 825.07, 825.08; 395/200.02, 200.15, 200.16, 200.17, 200.18, 200.2

[56] References Cited

U.S. PATENT DOCUMENTS

| | | | |
|---|---|---|---|
| 5,079,765 | 1/1992 | Nakamura | 370/85.13 |
| 5,301,273 | 4/1994 | Konishi | 370/85.13 |
| 5,329,527 | 7/1994 | Ujihashi et al. | 370/85.13 |

Primary Examiner—Wellington Chin
Assistant Examiner—Huy D. Vu

[57] ABSTRACT

A LAN-to-LAN connecting unit sends a node-status confirmation packet PKTC to LAN terminals under its command to confirm the status of each terminal. Upon receiving the confirmation packet, a normal terminal sends a response packet PKTR back to the LAN-to-LAN connecting unit. However, a LAN terminal incapable of receiving data because of a pulled cable or some other problem cannot send back the response packet. The LAN-to-LAN connecting unit identifies and stores information indicating whether a LAN terminal is capable or incapable of reception depending upon whether the response packet is received. In a case where an incoming call has been terminated at a prescribed LAN terminal and this terminal is capable of reception, the LAN-to-LAN connecting unit receives the data sent from the other party's LAN terminal and transmits this data to the LAN. In a case where the prescribed LAN terminal is incapable of reception, the connecting unit disconnects the line immediately. If a transfer destination has been registered to correspond to a terminal that is incapable of reception, received data is transferred to the transfer destination.

6 Claims, 23 Drawing Sheets

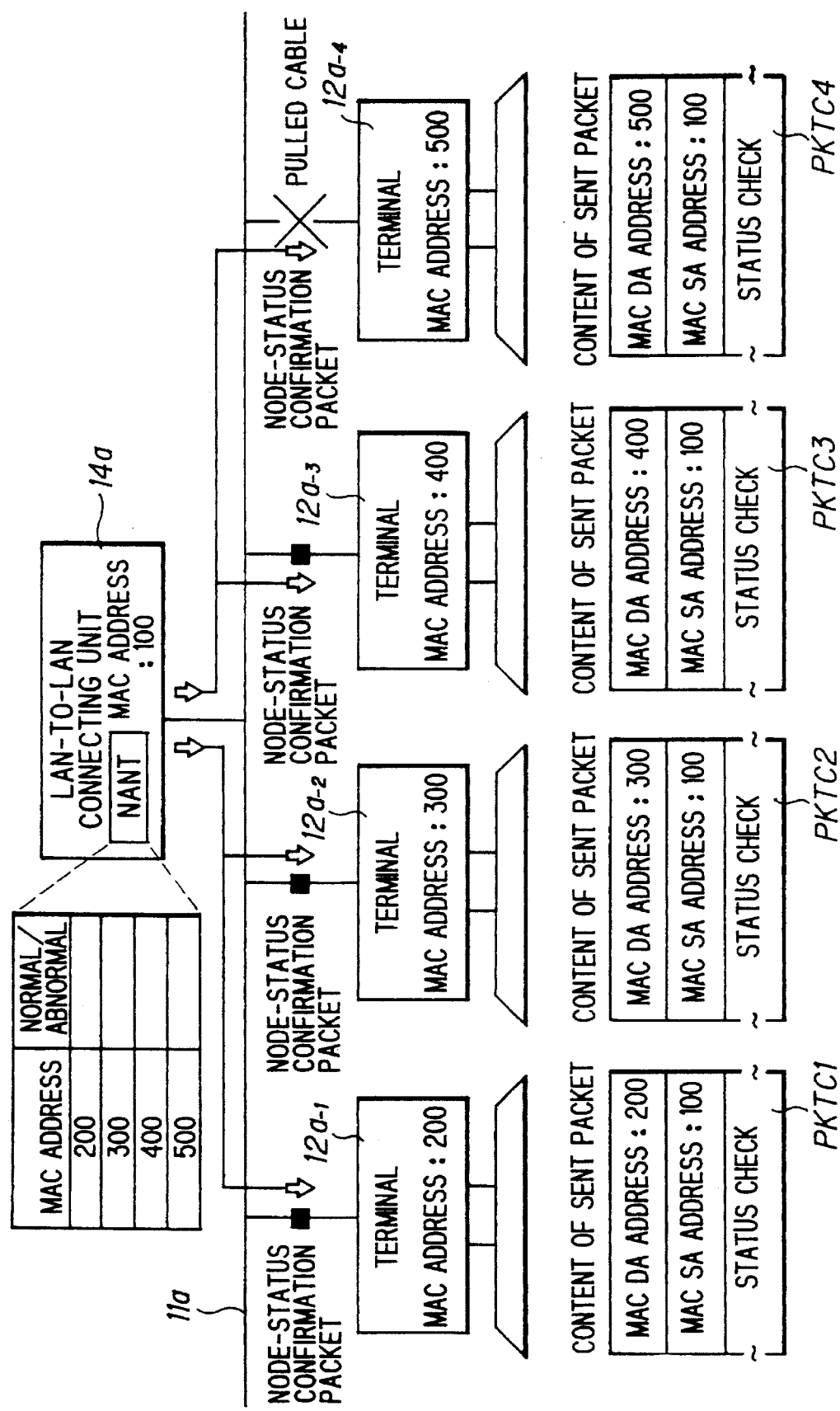

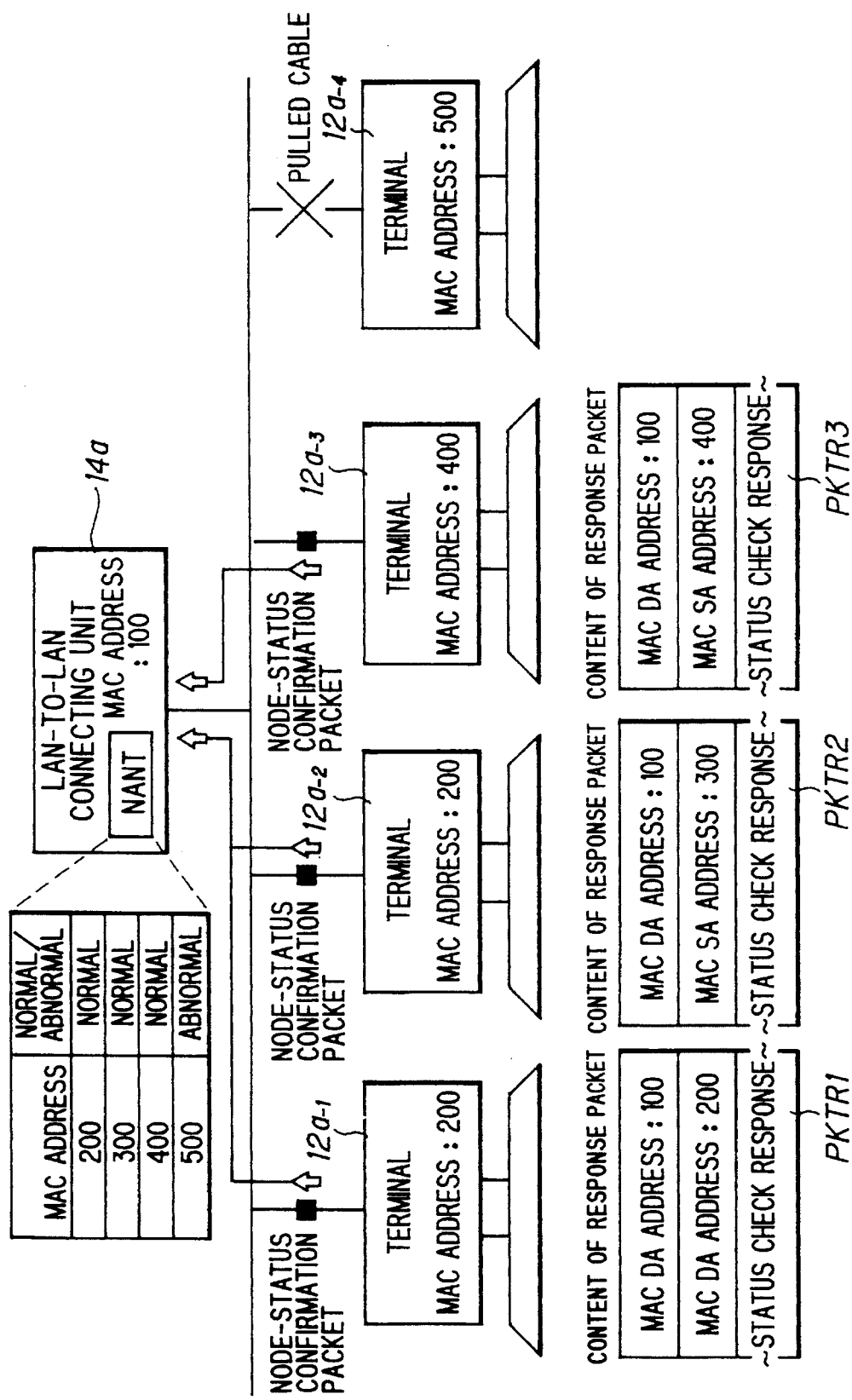

FIG.14

| TELEPHONE | ACCOMMODATING POSITION OF LAN-TO-LAN CONNECTION UNIT | ACCOMMODATING POSITION OF FIXED CONNECTION |
|---|---|---|
| TL 1 | $d_a$ $d_a$ $d_a$ $d_a$ $d_a$ $d_a$ | $d_b$ $d_b$ $d_b$ $d_b$ $d_b$ $d_b$ |
| TL 2 | $d_x$ $d_x$ $d_x$ $d_x$ $d_x$ $d_x$ | $d_y$ $d_y$ $d_y$ $d_y$ $d_y$ $d_y$ |
| ⋮ | ⋮ | ⋮ |

CTB

FIG.15

| LOGICAL NUMBER | ACCOMMODATING POSITION | TELEPHONE NUMBER |
|---|---|---|
| a a a a | $n_0$ $n_0$ $w_0$ $w_0$ $l_0$ $l_0$ | $d_c$ $d_c$ $d_c$ $d_c$ $d_c$ $d_c$ |
| b b b b | $n_1$ $n_1$ $w_1$ $w_1$ $l_1$ $l_1$ | $d_1$ $d_1$ $d_1$ $d_1$ $d_1$ $d_1$ |
| ⋮ | ⋮ | ⋮ |

LTB

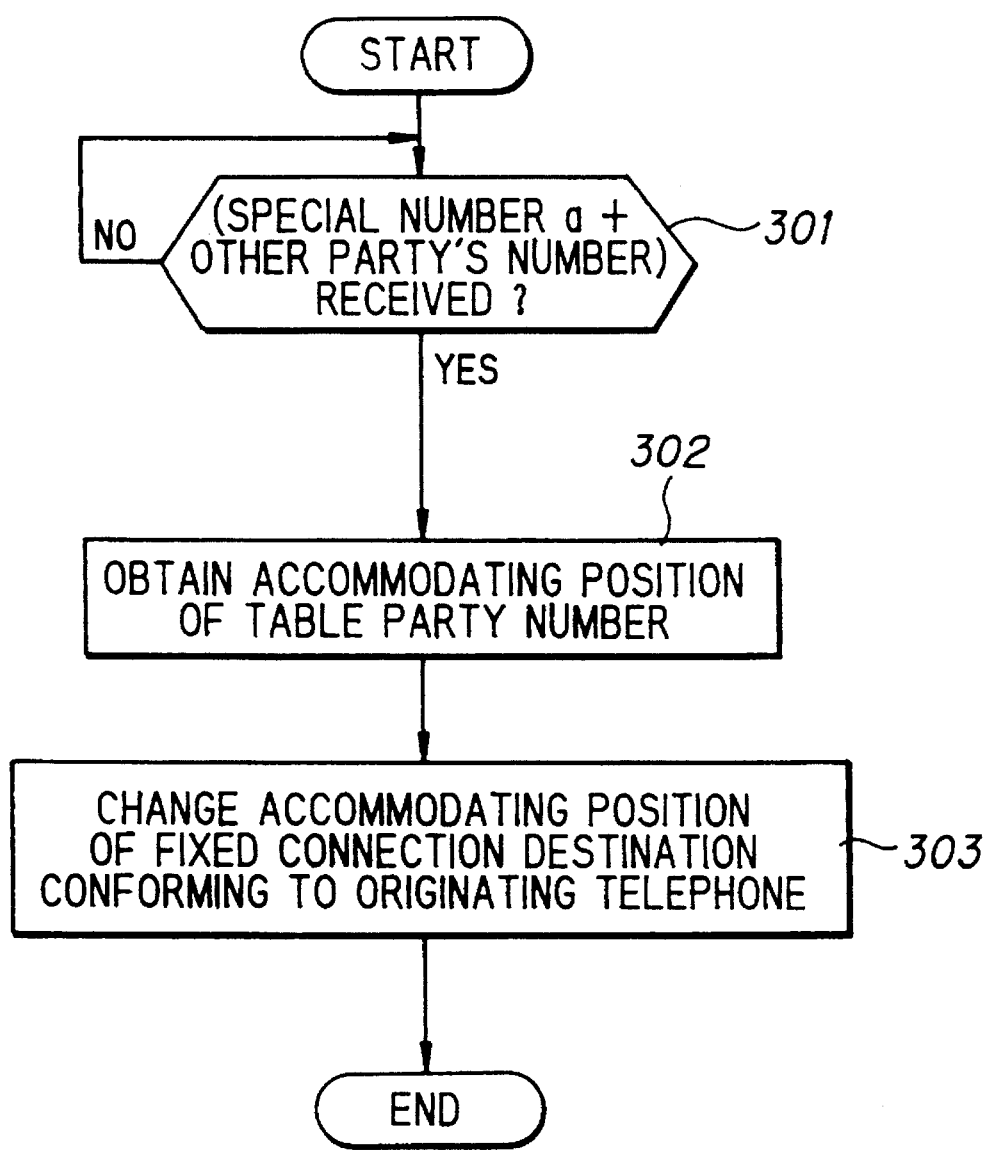

FIG.17

| TELEPHONE | ACCOMMODATING POSITION OF BRIDGE/ROUTER | ACCOMMODATING POSITION OF FIXED CONNECTION |
|---|---|---|
| TL 1 | $d_a$ $d_a$ $d_a$ $d_a$ $d_a$ $d_a$ | $d_b$ $d_b$ $d_b$ $d_b$ $d_b$ $d_b$ |
| TL 2 | $d_x$ $d_x$ $d_x$ $d_x$ $d_x$ $d_x$ | $d_y$ $d_y$ $d_y$ $d_y$ $d_y$ $d_y$ |
| ⋮ | ⋮ | ⋮ |

SPECIAL NUMBER a + OTHER PARTY'S NUMBER
( a a a a )

| LOGICAL NUMBER | ACCOMMODATING POSITION | TELEPHONE NUMBER |
|---|---|---|
| a a a a | $n_0$ $n_0$ $w_0$ $w_0$ $l_0$ $l_0$ | $d_c$ $d_c$ $d_c$ $d_c$ $d_c$ $d_c$ |
| b b b b | $n_1$ $n_1$ $w_1$ $w_1$ $l_1$ $l_1$ | $d_1$ $d_1$ $d_1$ $d_1$ $d_1$ $d_1$ |
| ⋮ | ⋮ | ⋮ |

FIG. 18

CTB

| TELEPHONE | ACCOMMODATING POSITION OF BRIDGE/ROUTER | ACCOMMODATING POSITION OF FIXED CONNECTION |
|---|---|---|
| TL 1 | $d_a\ d_a\ d_a\ d_a\ d_a\ d_a$ | $d_c\ d_c\ d_c\ d_c\ d_c\ d_c$ |
| TL 2 | $d_x\ d_x\ d_x\ d_x\ d_x\ d_x$ | $d_y\ d_y\ d_y\ d_y\ d_y\ d_y$ |
| ⋮ | ⋮ | ⋮ |

SPECIAL NUMBER b + OTHER PARTY'S NUMBER (aaaa) + TRANSFER-DESTINATION NUMBER ($d_2 d_2 d_2 d_2 d_2 d_2$)

| LOGICAL NUMBER | ACCOMMODATING POSITION | TELEPHONE NUMBER | TRANSFER-DESTINATION NUMBER |
|---|---|---|---|
| a a a a | $n_0\ n_0\ w_0\ w_0\ l_0\ l_0$ | $d_c\ d_c\ d_c\ d_c\ d_c\ d_c$ | $d_2\ d_2\ d_2\ d_2\ d_2\ d_2$ |
| b b b b | $n_1\ n_1\ w_1\ w_1\ l_1\ l_1$ | $d_1\ d_1\ d_1\ d_1\ d_1\ d_1$ | |
| | $n_2\ n_2\ w_2\ w_2\ l_2\ l_2$ | $d_2\ d_2\ d_2\ d_2\ d_2\ d_2$ | ⋮ |
| ⋮ | ⋮ | ⋮ | |

LTB

FIG. 20

| LOGICAL NUMBER | ACCOMMODATING POSITION | TELEPHONE NUMBER | TRANSFER-DESTINATION NUMBER | DESIGNATED STARTING TIME | DESIGNATED END TIME |
|---|---|---|---|---|---|
| a a a a | $n_0 n_0 w_0 w_0 l_0 l_0$ | $d_0 d_0 d_0 d_0 d_0 d_0$ | x x x x | $h_0 h_0 : m_0 m_0$ | $h_1 h_1 : m_1 m_1$ |
| b b b b | $n_1 n_1 w_1 w_1 l_1 l_1$ | $d_1 d_1 d_1 d_1 d_1 d_1$ | y y y y | $h_2 h_2 : m_2 m_2$ | $h_3 h_3 : m_3 m_3$ |
| - - - | - - - | - - - | - - - | - - - | - - - |

LTB

LAN-TO-LAN COMMUNICATION METHOD, AND LAN-TO-LAN CONNECTING UNIT

BACKGROUND OF THE INVENTION

This invention relates to a LAN-to-LAN communication method as well as to a unit for interconnecting LANs in which LAN-to-LAN communication is performed in accordance with the status of each LAN terminal. Further, the invention relates to a LAN-to-LAN communication method, and a LAN-TO LAN connecting unit, in which LAN-to-LAN communication is performed by changing over a destination LAN-to-LAN connecting unit.

In order to interconnect LANs (local area networks) that are remote from each other, a so-called wide area network (WAN) such as a telephone network, data switching network, ISDN or leased circuit is used as the intermediary. A LAN-to-LAN connecting unit which is a router or bridge is provided between each LAN and the WAN.

A router has a LAN interface and a WAN interface. The LAN interface is connected to the LAN and controls first, second and third layers, namely a physical layer, a link layer and a network layer. The WAN interface is connected to the WAN and controls interfacing with the WAN. Communication between LANs using such routers is performed as follows: When a terminal sends out a frame having a MAC address and a network address attached thereto, the router executes filtering processing and accepts the necessary frame, refers to the network address contained in the frame and issues an outgoing call to the WAN to effect a connection to the party that is the destination of the call. The router then sends the frame to the LAN of the other party via the WAN. The router connected to the LAN of the other party accepts the received frame and sends it to this LAN. The LAN terminal having a MAC address identical with terminating-party MAC address contained in the frame accepts this frame.

The bridge has a LAN interface, a WAN interface and an office data table indicating the correlation between destination MAC addresses and telephone numbers. The LAN interface is connected to the LAN and the WAN interface is connected to the WAN. Communication between LANs using such bridges is performed as follows: When a terminal sends out a frame having a MAC address attached thereto, the bridge executes filtering processing, accepts the necessary frame and extracts the MAC address. Next, the bridge refers to the local data table to obtain the destination telephone number and issues an outgoing call using this telephone number to effect a connection to the party that is the destination of the call. Alternatively, the bridge can effect the connection to the destination manually in advance by issuing an outgoing call to the destination telephone number corresponding to the destination MAC address. Thereafter, the bridge sends the frame to the LAN of the other party via the WAN. The bridge connected to the LAN of the other party accepts the frame and sends it to this LAN. The LAN terminal having a MAC address identical with terminating-party MAC address contained in the frame accepts this frame.

FIG. 21 is a diagram illustrating the configuration of a LAN-to-LAN communication system. The system includes LANs (LAN 1, LAN 2) 1a, 1b such as Ethernets, LAN terminals 2a, 2b, a wide-area network (WAN) 3 such as a telephone network, data switching network, ISDN or leased circuit, and bridges or routers (LAN-to-LAN connecting units) 4a, 4b. The terminal 2a is assigned a MAC address 100, and the terminal 2b is assigned a MAC address 200.

FIG. 22 is a block diagram illustrating the LAN-to-LAN connecting unit (e.g., a router). The unit includes a LAN interface 5a connected to the LAN, a WAN interface 5b connected to the WAN, a sending/receiving controller 5c on the LAN side, an address data base 5d storing the MAC addresses of LAN terminals covered by the system, a processor 5e, a memory 5f, a sending/receiving controller 5g on the WAN side and an originating/terminating processor 5h.

FIG. 23 is a diagram showing the basic constitution of a frame. A set of data delimited by a start delimiter (SD) and an end delimiter (ED) is a frame. In a LAN, a frame is one unit of transmission. The frame starts with a start delimiter of one octet, which is followed by a control field of one or two octets. Depending upon the LAN, there are frames which do not have a control field. The control field is followed by a destination address (DA) and a source address (SA), then by an information field (I) for introducing the information desired to actually be transmitted, and a frame check sequence (FCS). In layer 2 (L2), DA, SA are MAC addresses and are allocated to each terminal. The above-mentioned MAC addresses are used in communication in which a WAN does not take part. However, in order to perform LAN-LAN communication via a WAN, the information field I is further subdivided into a control information field, a destination address DA, which is a network address (corresponding to a telephone number), a source address SA and an information field. The information field can be sent in the form of packets, in which case frames are referred to as packets.

When a transmission packet shown in FIG. 23 is issued by the LAN terminal 2a (FIG. 21), the LAN interface 5a of the router 4a accepts the packet and applies it to the sending/receiving controller 5c. The latter checks the address data base 5d to determine whether a MAC destination address DA is present in the data base. If the address is absent, the controller 5c inputs the received packet to the processor 5e. If the address exists, on the other hand, this means that the packet is that of another LAN terminal destination under the router's command. The controller 5c therefore discards the received packet. Further, the sending/receiving controller 5c checks the address data base 5d to determine whether a source address SA is present. If the address is absent, the controller 5c registers the source address SA in the address data base 5d.

The processor 5e buffers the packet from the send/receive controller 5c in the memory 5f, obtains the destination address DA serving as the network address and notifies the originating/terminating processor 5h. Upon being notified of the destination address DA (telephone number), the originating/terminating processor 5h sends an outgoing call to the WAN via the WAN interface 5b and establishes a connection with the LAN-to-LAN connecting unit of the other party. When the above-described call processing control ends, the sending/receiving controller 5g on the WAN side reads packets out of the memory 5f in succession and transmits these packets to the WAN via the WAN interface 5b. As a result, the transmitted packets are accepted by the LAN-to-LAN connecting unit on the terminating side.

The sending/receiving controller 5g of the LAN-to-LAN connecting unit on the terminating side stores the packets accepted via the WAN interface 5b, and the sending/receiving controller 5c on the LAN side reads the received packets out of the memory and transmits them to the LAN via the LAN interface 5a. The LAN terminal having a MAC address identical with the terminating MAC address contained in the packets accepts the packets and sends a response packet back to the LAN-to-LAN connecting unit on the terminating side.

The foregoing is an overview of operation in a case where LANs communicate via a WAN.

As shown in FIG. 24, there are cases in which the LAN terminal 2b on the receiving side is incapable of receiving data because a cable has been pulled out or as the result of some other problem. In such case the LAN-to-LAN connecting unit 4b on the terminating side sends a received packet to the LAN 2 and then waits for reception of a response packet. If the response packet is not received within a fixed period of time, then the connecting unit 4b disconnects the line. Thus, in conventional LAN-LAN communication, the line is eventually disconnected if the terminal on the terminating side is incapable of reception. However, since the line remains connected for the period of time during which reception of the response packet is being awaited, this waiting time also is billed. Thus, a problem with the conventional system is higher line cost.

Further, when the called party is incapable of reception in conventional LAN-LAN communication, it is necessary to perform the transmitting operation again to transmit data after the line has been disconnected. There are many cases in which it would be convenient if the data could be transferred to another terminal even if the receiving party is in a state in which reception is not possible. For example, if the receiving party is a printer terminal for printing received data and there is a printer terminal available separate from the former terminal, it would be convenient if the latter terminal could receive and print the data in the event that the former terminal is incapable of reception. With the conventional communication system, however, the data cannot be transferred to another terminal.

SUMMARY OF THE INVENTION

Accordingly, a first object of the present invention is to provide a LAN-to-LAN communication method, as well as a LAN-to-LAN connecting unit, whereby a line can be disconnected immediately to reduce line-use cost if a terminal on the terminating side is incapable of reception.

A second object of the present invention is to provide a LAN-to-LAN communication method, as well as a LAN-to-LAN connecting unit, whereby data is capable of being transferred to and received by a previously registered transfer destination if a terminal on the terminating side is incapable of reception.

Methods of interconnecting remote LANs via an exchange circuit are of two types. According to the method of the first type, connection processing is executed only at the time of communication upon referring to the destination address in the LAN data, namely the MAC address in the case of a bridge and the network address (IP address) in the case of the router. According to the method of the second type, an exchange circuit associated with the connection between the LANs is kept connected at all times.

The method of the first type involves low line cost since the line is used only when communication is performed. However, since the cost of the unit per se is high, the number of LANs that can be installed tends to be limited. With the method of the second type, apparatus cost is low but the cost of line use is high since the apparatus is connected at all times. This means that the LANs connected are severely limited only to those having very high traffic.

Accordingly, a third object of the present invention is to provide a LAN-to-LAN communication method in which the destination LAN can be selected and LAN-to-LAN communication carried out through a simple construction and at low line-use cost utilizing the function of an electronic exchange.

According to the present invention, the first object is attained by providing a LAN-to-LAN communication method, as well as a unit for realizing this method, comprising the steps of sending confirmation data from a LAN-to-LAN connecting unit to LAN terminals, which are under the command of the connecting unit, in order to confirm the status of each LAN terminal; identifying and storing information indicating whether a LAN terminal is in a reception possible/impossible state depending upon whether this LAN terminal responds to the confirmation data; in a case where an incoming call from another party has been terminated at a prescribed LAN terminal, determining whether this prescribed LAN terminal is in the reception-possible state by referring to the stored information; in a case where the prescribed LAN terminal is in the reception-possible state, receiving data sent from a LAN terminal of the other party and sending this data to the prescribed LAN; and in a case where the prescribed LAN terminal is in the reception-impossible state, disconnecting the line.

According to the present invention, the second object is attained by providing a LAN-to-LAN communication method, as well as a LAN-to-LAN communication unit for realizing this method, comprising the steps of registering transfer destinations of received data in a table beforehand; in a case where an incoming call has been terminated at a prescribed LAN terminal, obtaining a LAN terminal which is a transfer destination by referring to the table when the prescribed LAN terminal is in the reception-impossible state; and rewriting a MAC address contained in the received data to a MAC address of the transfer destination and then sending this MAC address to a LAN terminal at this transfer destination.

According to the present invention, the third object is attained by providing a LAN-to-LAN communication method comprising the steps of previously storing a LAN-to-LAN connecting unit and a destination LAN-to-LAN connecting unit in a memory of an electronic exchange in 1:1 correspondence; when a connection request is received from a prescribed LAN-to-LAN connecting Knit, causing the electronic exchange to obtain a destination LAN-to-LAN connecting unit which corresponds to this prescribed LAN-to-LAN connecting unit; connecting the LAN-to-LAN connecting unit that issued the connection request to the destination LAN-to-LAN connecting unit obtained and performing LAN-to-LAN communication; when an external device issues a change request for changing the destination LAN-to-LAN connecting unit, updating the corresponding relationship, which has been stored in the memory, in response to the change request; and when a subsequent connection request is received from the LAN-to-LAN connecting unit, connecting the LAN-to-LAN connecting unit to the updated destination LAN-to-LAN connecting unit and performing LAN-to-LAN communication.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram for describing node status confirmation;

FIG. 5 is a diagram for describing node status response;

FIG. 14 is a diagram for describing a table of connection destinations;

FIG. 15 is a diagram for describing a table of LAN-to-LAN connecting units;

FIG. 16 is a flowchart of control for when a connection destination is changed;

FIG. 17 is a diagram for describing control for changing a connection destination;

FIG. 18 is a diagram for describing transfer control;

FIG. 20 is a diagram for describing a table containing transfer destination numbers and time periods during which transfer is made to transfer destinations;

DESCRIPTION OF THE PREFERRED EMBODIMENTS

Figure 1A:
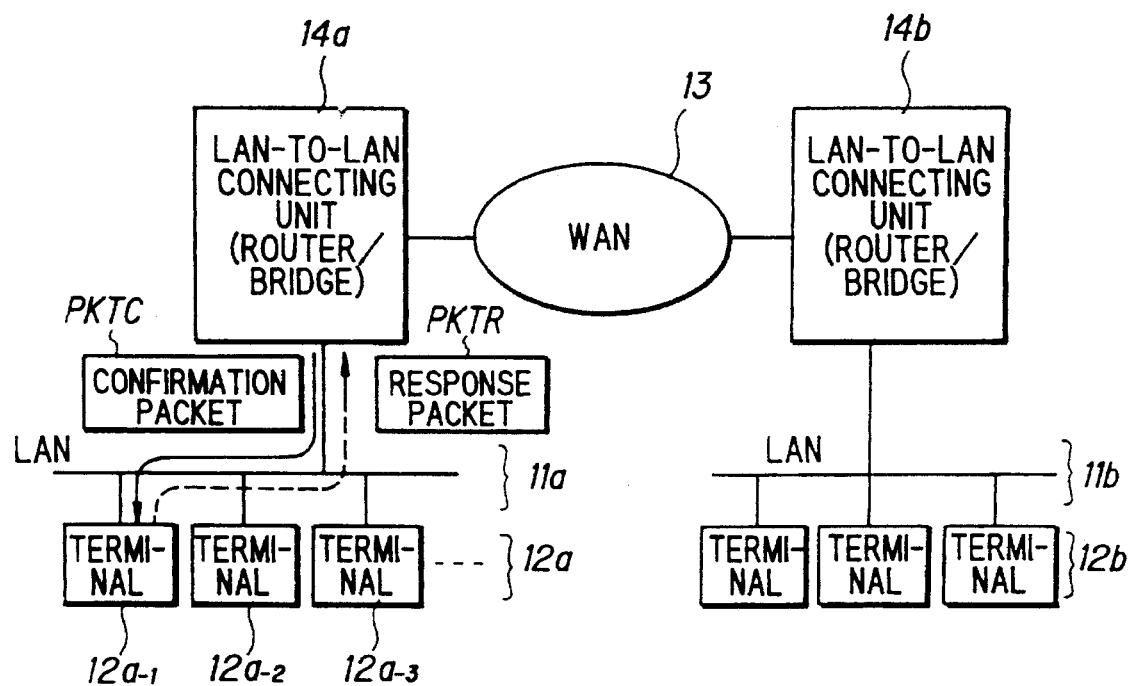
FIGS. 1A and 1B are diagrams for describing the principles of the present invention.
Figure 1B:
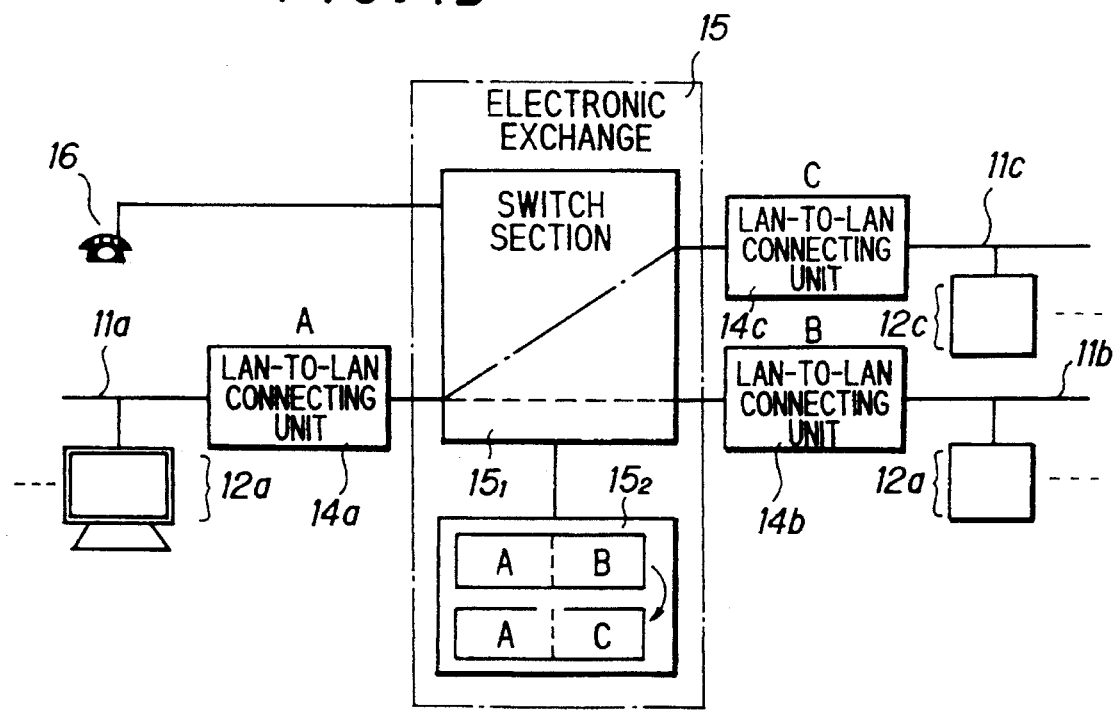

FIGS. 1A and 1B are diagrams for describing the principles of the present invention.

Shown in FIG. 1A are LANs 11a, 11b having respective terminals 12a, 12b, a WAN 13, LAN-to-LAN connecting units 14a, 14b, a node-status confirmation packet PKTC, and a node-status response packet PKTR issued in response to the packet PKTC.

Shown in FIG. 1B are LANs 11a, 11b, 11c having respective terminals 12a, 12b, 12c, LAN-to-LAN connecting units (A, B, C) 14a, 14b, 14c, an electronic exchange 15, a network section $15_1$, a processor $15_2$ and a telephone 16.

(a-1) First LAN-to-LAN communication method (see FIG. 1A)

The LAN-to-LAN connecting unit 14a sends confirmation data (the node-status confirmation packet PKTC) to LAN terminals 12a-1, 12a-2, 12a-3 . . . under its command. Upon receiving the confirmation packet, each terminal sends the node-status response packet PKTR back to the LAN-to-LAN connecting unit 14a. Accordingly, a LAN terminal in a normal state and capable of receiving data sends the response packet back to the LAN-to-LAN connecting unit 14a, whereas a LAN terminal incapable of receiving data because of a pulled cable or some other problem cannot send back the response packet. The LAN-to-LAN connecting unit 14a identifies and stores information indicating whether a LAN terminal is capable or incapable of reception depending upon whether the response packet is received. In a case where an incoming call has been terminated at a prescribed LAN terminal under these conditions, the LAN-to-LAN connecting unit 14a determines whether this LAN terminal is capable of reception by referring to the stored information. In a case where this LAN terminal is capable of reception, the LAN-to-LAN connecting unit 14a receives the data sent from the other party's LAN terminal via the WAN 13 and transmits this data to the LAN 11a. In a case where the prescribed LAN terminal is incapable of reception, the connecting unit 14a refuses reception of the data and disconnects the line.

If this arrangement is adopted, the line can be disconnected immediately if reception is impossible. This makes it possible to reduce the cost of line use.

Further, destinations for transfer of received data are registered beforehand in a table within the LAN-to-LAN connecting unit 14a. In a case where an incoming call has been terminated at a prescribed LAN terminal under these conditions, the LAN-to-LAN connecting unit 14a obtains a LAN terminal which is a transfer destination by referring to the stored information when the prescribed LAN terminal is incapable of reception, rewrites a MAC address contained in the received data to a MAC address of the transfer destination and then sends this rewritten MAC address to a LAN terminal at this transfer destination. This arrangement is convenient since data can be transferred to a different terminal if the original destination for reception is incapable of reception.

(a-2) Second LAN-to-LAN communication method (see FIG. 1B)

The LAN-to-LAN connecting unit 14a and the destination LAN-to-LAN connecting unit 14b are stored in a memory of the electronic exchange 15 in 1:1 correspondence. When a connection request is generated by the LAN-to-LAN connecting unit 14a, the electron exchange 15 refers to the stored information, connects the LAN-to-LAN connecting unit (A) 14a to the destination LAN-to-LAN connecting unit (B) 14b and allows LAN-to-LAN communication to take place. When an external device such as the telephone 16 issues a change request for changing the destination LAN-to-LAN connecting unit, the electronic exchange 15 stores the destination LAN-to-LAN connecting unit (C) 14c in the memory so as to correspond to the LAN-to-LAN connecting unit (A) 14a. When there is a subsequent connection request from the LAN-to-LAN connecting unit 14a, the electronic exchange 15 connects the LAN-to-LAN connecting unit 14a to the changed destination LAN-to-LAN connecting unit (C) 14c and allows LAN-to-LAN communication between the two LANs.

If this arrangement is adopted, an electronic exchange makes LAN-to-LAN communication possible by connecting a LAN-to-LAN connecting unit that has issued a connection request to a registered destination LAN-to-LAN connecting unit only when there is a request for LAN-to-LAN communication. Further, if the destination LAN-to-LAN connecting unit is changed by a connection-change request from a telephone or the like, the electronic exchange can subsequently connect a LAN-to-LAN connecting unit that has issued a connection request to the destination LAN-to-LAN connecting unit to which the change has been made, thereby making LAN-to-LAN communication possible.

As a result of such an arrangement, a LAN that is the destination of a connection can be changed and communication made possible with this LAN through a simply constructed apparatus and at low cost for line use. Further, by registering a LAN-to-LAN connecting unit that is the destination of a transfer so as to correspond to the other party's LAN-to-LAN connecting unit, the LAN-to-LAN connecting unit that has issued a connection request can be connected to the LAN-to-LAN connecting unit that is the transfer destination to make LAN-to-LAN communication possible. Furthermore, by registering a LAN-to-LAN connecting unit that is the destination of a transfer and a transfer time period so as to correspond to the other party's LAN-to-LAN connecting unit, the LAN-to-LAN connecting unit that has issued a connection request can be connected to the LAN-to-LAN connecting unit only at times that fall within the transfer time period, thereby making LAN-to-LAN communication possible within this time period.

(b) First embodiment of the invention (b-1) Overall configuration

Figure 2:
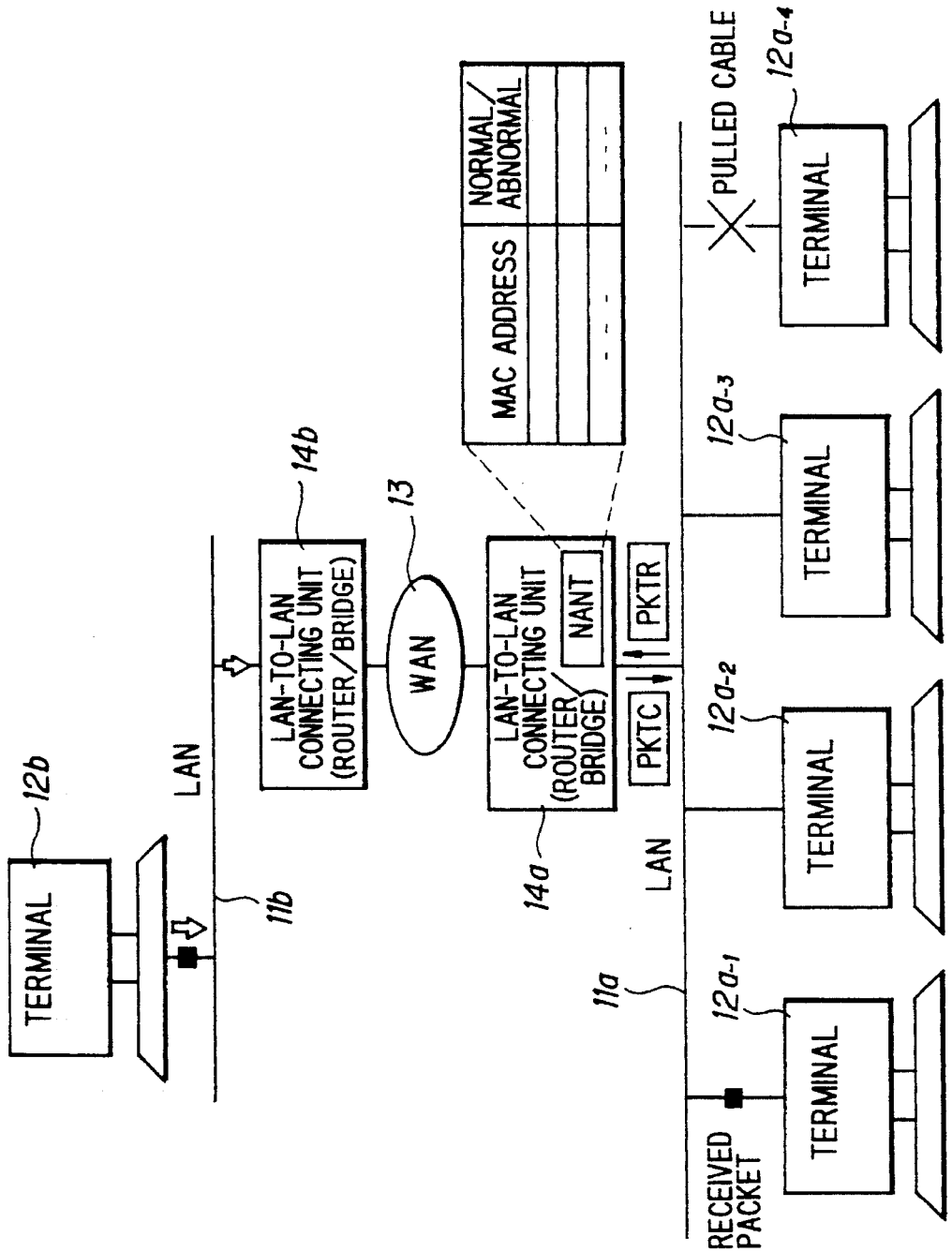
FIG. 2 is a diagram illustrating the configuration of a LAN-to-LAN communication system according to the present invention.
Figure 22:
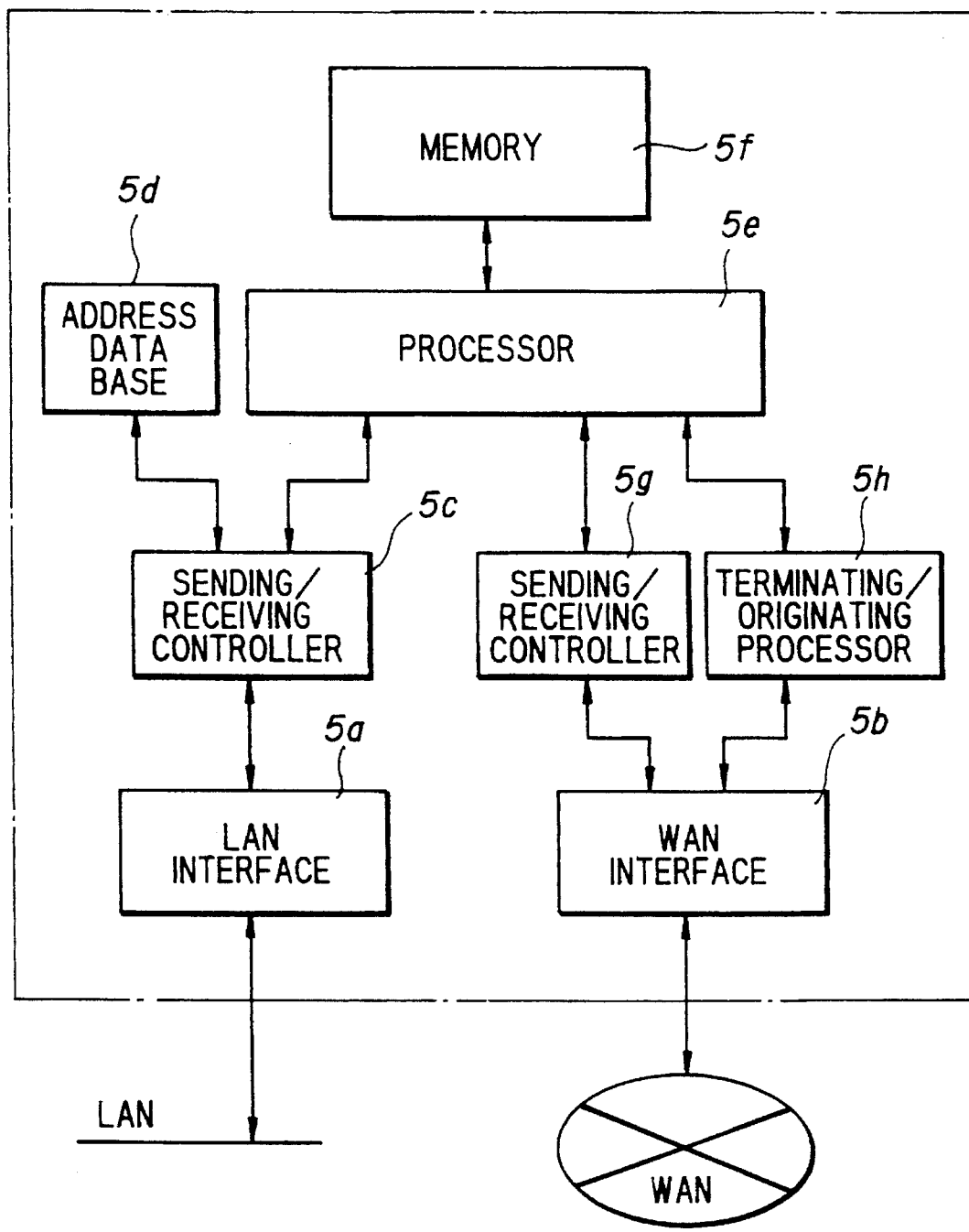
FIG. 22 is a diagram showing the construction of a LAN-to-LAN connecting unit (router)
Figure 23:
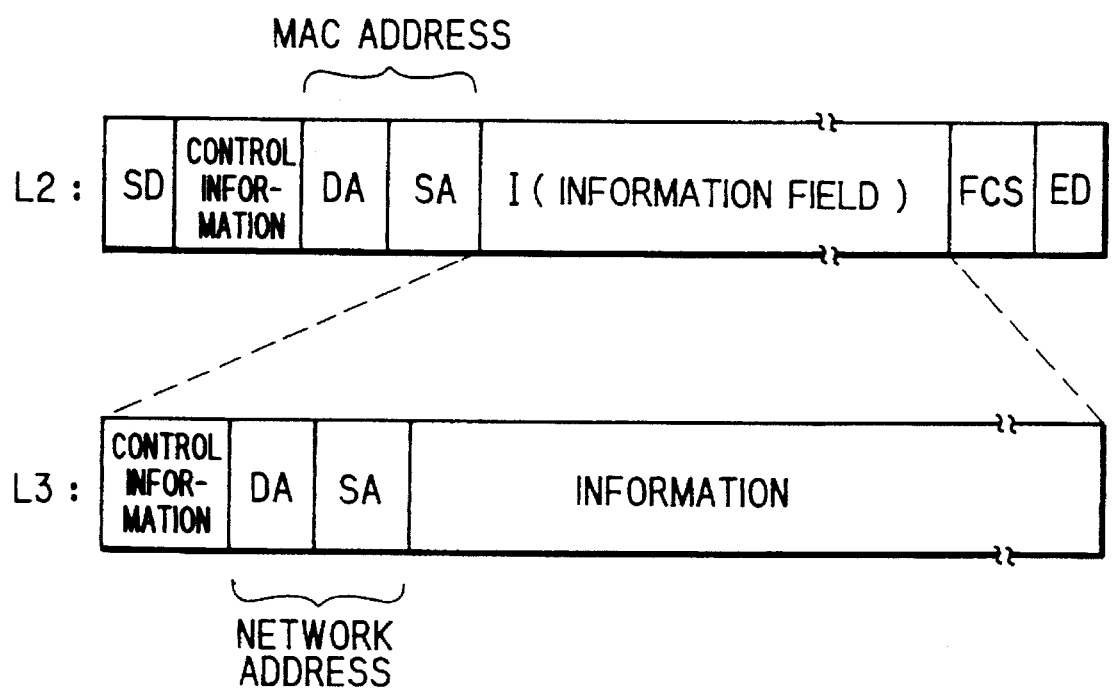
FIG. 23 is a diagram showing frame constitution.
Figure 24:
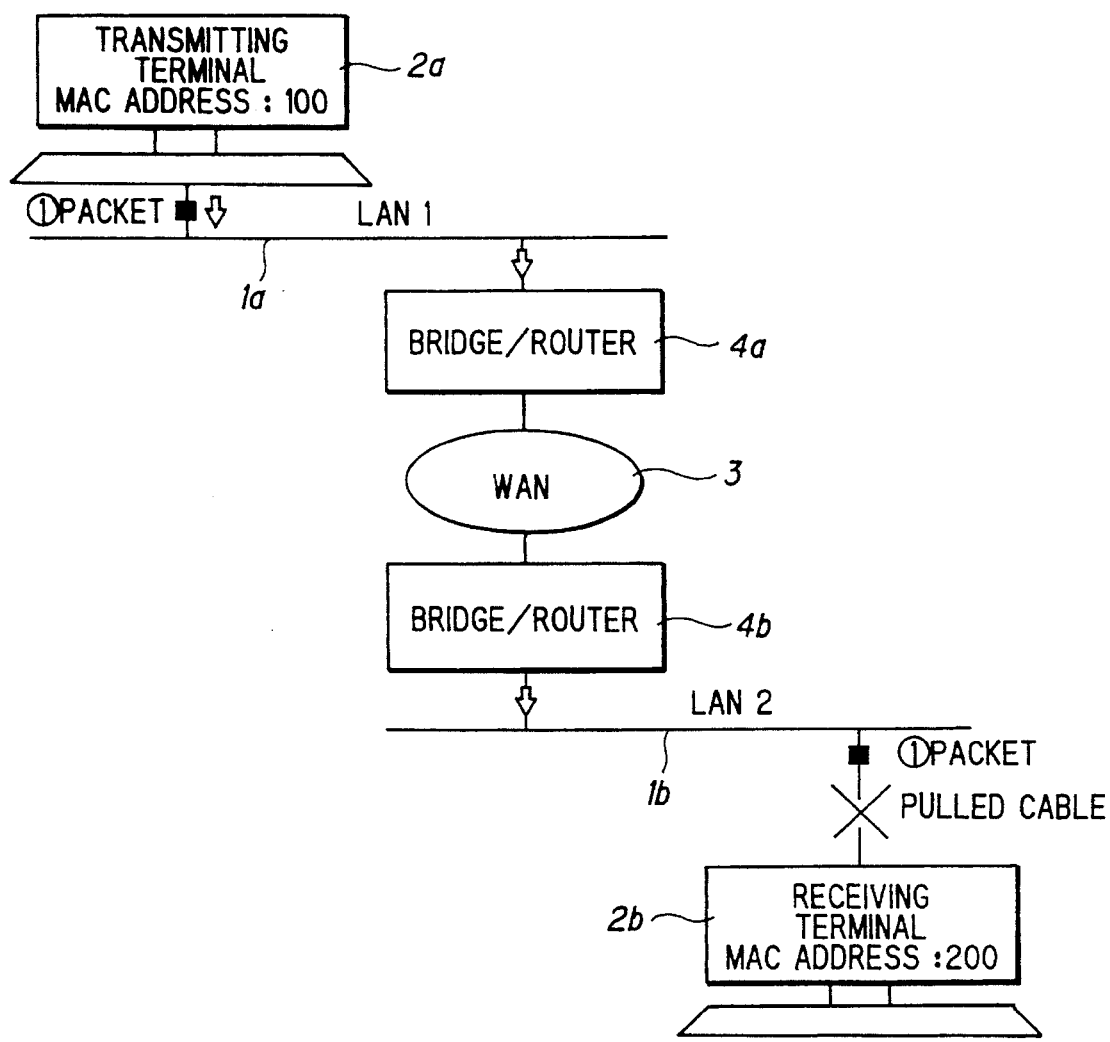
FIG. 24 is a diagram for describing control when reception is impossible.

FIG. 2 is a diagram illustrating the configuration of a LAN-to-LAN communication system for practicing the LAN-to-LAN communication method of the present invention. Shown in FIG. 2 are the LANs 11a, 11b, the LAN terminals 12a-1 - 12a-4, 12b, the WAN 13 and the LAN-to-LAN connecting units 14a, 14b such as routers or bridges (here assumed to be router). The LAN-to-LAN connecting units 14a, 14b have the construction shown in FIG. 22. Each has an internal memory provided with a node-status table NANT for storing information indicating whether LAN terminals under its command are normal or abnormal (capable or incapable of reception).

The LAN-to-LAN connecting unit 14a periodically sends the node-status confirmation packet PKTC for confirmation of terminal status to the LAN terminals 12a-1, 12a-2, 12a-3, 12a-4 . . . under command. Upon receiving the node-status confirmation packet PKTC, the LAN terminals 12a-1, 12a-2, 12a-3, 12a-4 . . . send the node-status response packet PKTR back to the LAN-to-LAN interconnecting unit 14a. Accordingly, when a LAN terminal in a normal state and capable of receiving data receives the node-status confirmation packet PKTC, it sends the node-status response packet PKTR back to the LAN-to-LAN interconnecting unit 14a. However, a LAN terminal incapable of receiving data because of a pulled cable or some other problem cannot send back the node-status response packet PKTR. The LAN-to-LAN connecting unit 14a identifies whether a LAN terminal is in a state in which it is capable or incapable of reception depending upon whether the node-status response packet PKTR is received from the LAN terminal, and stores this in the node-status table NANT.

(b-2) Frame constitution

Figure 3A:
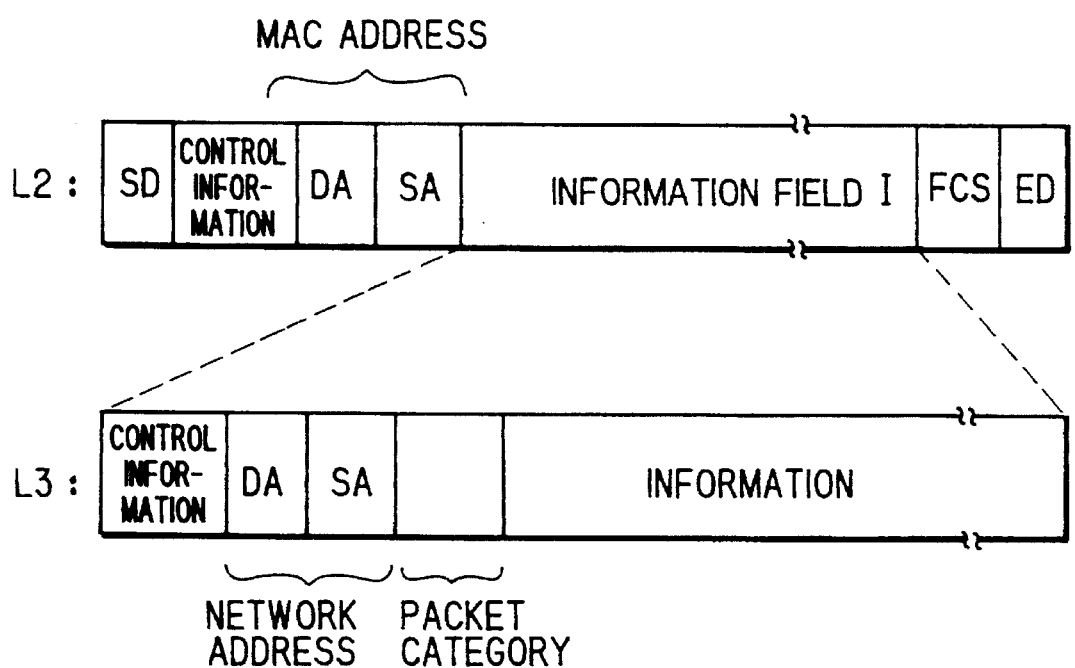
FIGS. 3A and 3B are diagrams showing frame constitution.
Figure 3B:
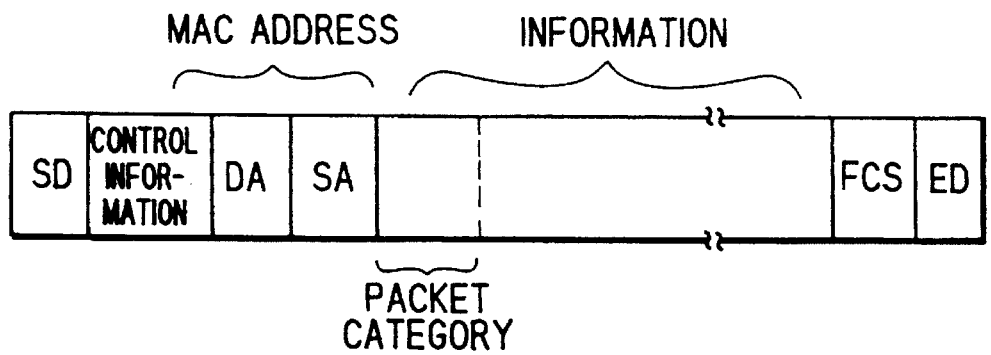

FIG. 3 shows the basic constitution of frames, in which FIG. 3A shows frame constitution in case of a router and FIG. 3B frame constitution in case of a bridge. A control field, MAC addresses (destination address DA and source address SA) for layer 2, an information field I and frame check sequence FCS are placed between a start delimiter (SD) and an end delimiter (ED). The frame for a bridge has the above-mentioned frame construction. A packet category section (command section) of one octet is provided at the head of the information frame I so that it is possible to identify the packet category (command category), such as the node-status confirmation packet category or node-status response packet category. The information field I of the frame for a router is further subdivided into a control information portion, a destination address DA, which is a network address (corresponding to a telephone number), a source address SA and an information portion. The information field is transmitted in the form of packets.

(b-3) Node-status confirmation control

FIG. 4 is an explanatory view for describing confirmation of the status of each LAN terminal (node). The MAC address of the LAN-to-LAN connecting unit 14a is 100, and the MAC addresses of the terminals 12a-1, 12a-2, 12a-3, 12a-4 . . . are 200, 300, 400, 500 . . . , respectively. The LAN-to-LAN connecting unit 14a periodically sends the node-status confirmation packets PKTC1, PKTC2, PKTC3, PKTC4 . . . to the respective LAN terminals 12a-1, 12a-2, 12a-3, 12a-4 . . . that are under command. Each node-status confirmation packet PKTCi contains a MAC destination address DA (=200~500), a MAC source address SA (=100) and a node-status confirmation command.

FIG. 5 is a diagram for describing the node-status response of a LAN terminal. Upon receiving the node-status confirmation packet PKTCi, each LAN terminal sends the node-status response packet PKTR back to the LAN-to-LAN connecting unit 14a. A LAN terminal in the normal state and capable of receiving data sends the node-status response packet PKTR back to the LAN-to-LAN interconnecting unit 14a. However, a LAN terminal incapable of receiving data because of a pulled cable or some other problem cannot send back the node-status response packet PKTR. In FIG. 5, assume that the LAN terminals 12a-1~12a-3 are normal and that the LAN terminal 12a-4 is incapable of data reception because its cable has been pulled out. In such case the LAN terminals 12a-1~12a-3 send back the respective node-status response packets PKTR1–PKTR3 but the LAN terminal 12a-4 cannot send back its node-status response packet. The node-status response packet contains a MAC destination address DA (=100), a MAC source address SA (=200~400) and a node-status response command.

Depending upon whether a node-status response packet is received or not, the LAN-to-LAN connecting unit 14a recognizes whether each of the LAN terminals 12a-1~12a-4 is normal or abnormal (capable or incapable of receiving data) and stores this information in the table NANT.

Figure 6:
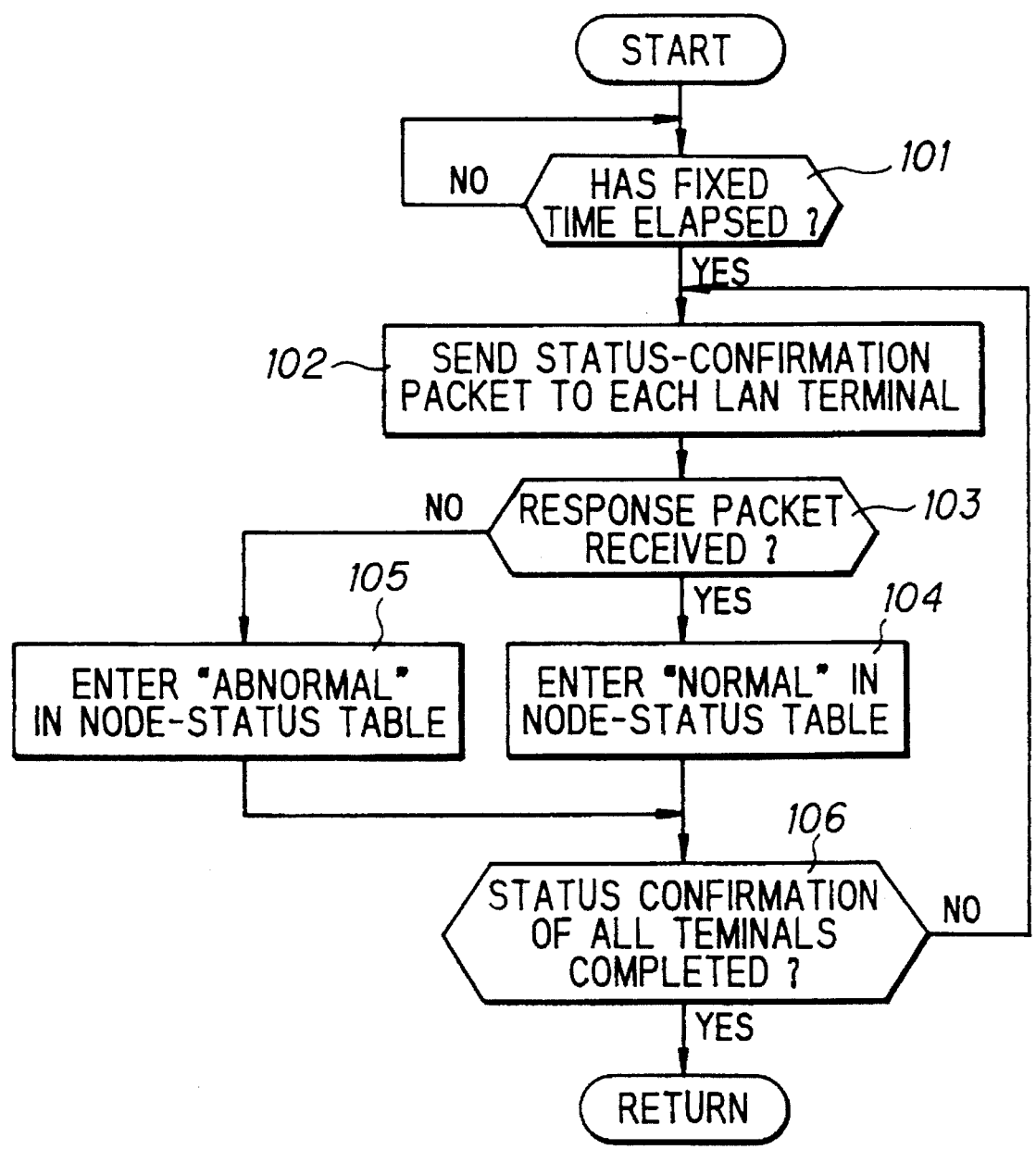
FIG. 6 is a flowchart showing control for confirming node status.

FIG. 6 is a flowchart illustrating control for confirming node status by the LAN-to-LAN connecting unit.

Monitoring is performed at step 101 to determine whether a fixed period of time has elapsed. If this fixed time period has elapsed, then a node-status confirmation packet PKTCi is transmitted to a prescribed LAN terminal (step 102), after which a response packet is awaited (step 103). If the response packet is received, "normal" is entered in the normal/abnormal section, which corresponds to this LAN terminal (MAC address), of the node-status table NANT (step 104). If the response packet is not received, "abnormal" is entered in this section (step 105). Next, it is determined whether confirmation of the status of all LAN terminals under command has been completed (step 106). If confirmation has not been completed, the program returns to step 102 and processing similar to that described is repeated with regard to the next LAN terminal. If confirmation has been completed, then status-confirmation processing is terminated and the program returns to the beginning.

(b-4) Packet reception control

Figure 7:
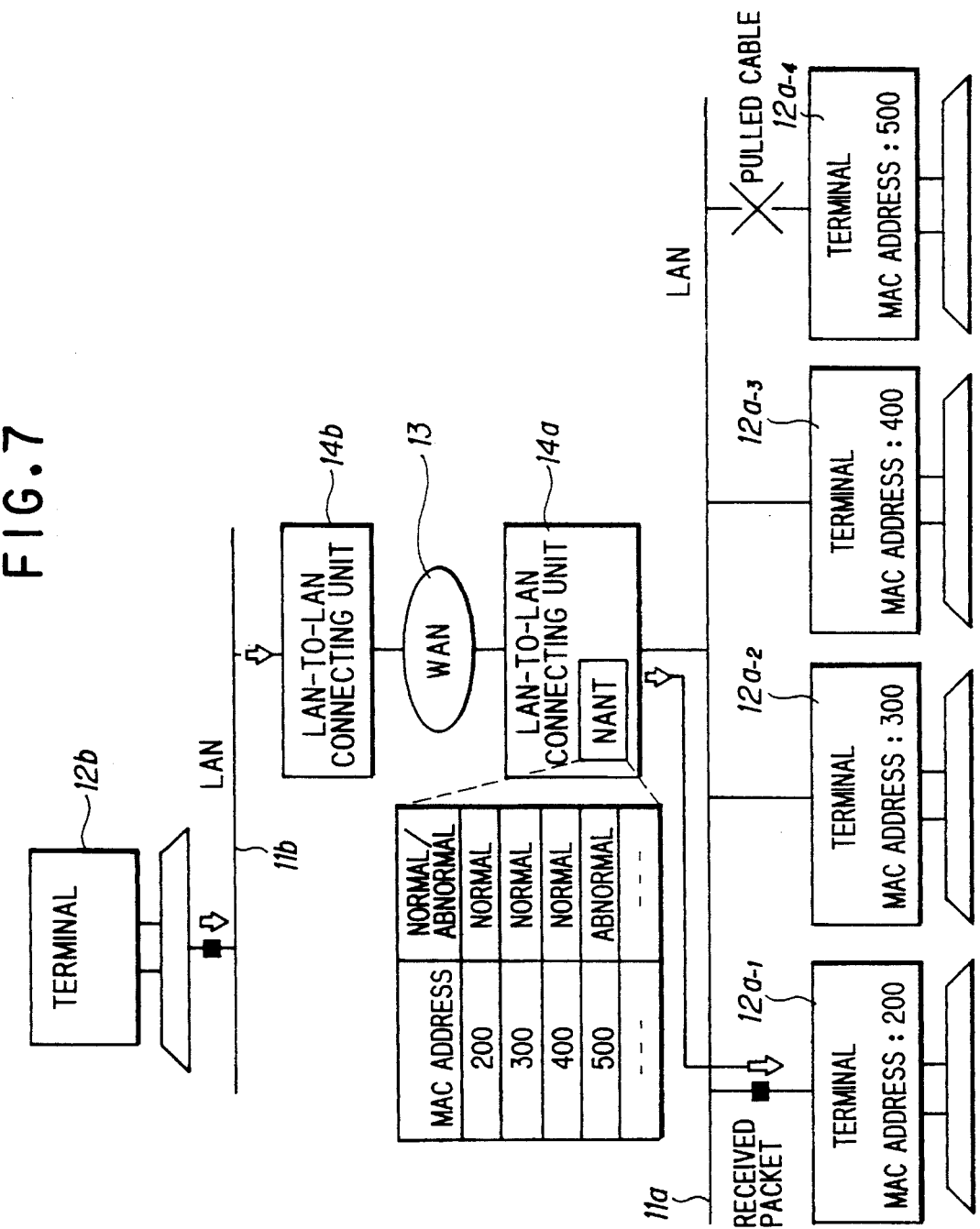
FIG. 7 is a diagram for describing operation when a call is terminated at a normal terminal.
Figure 8:
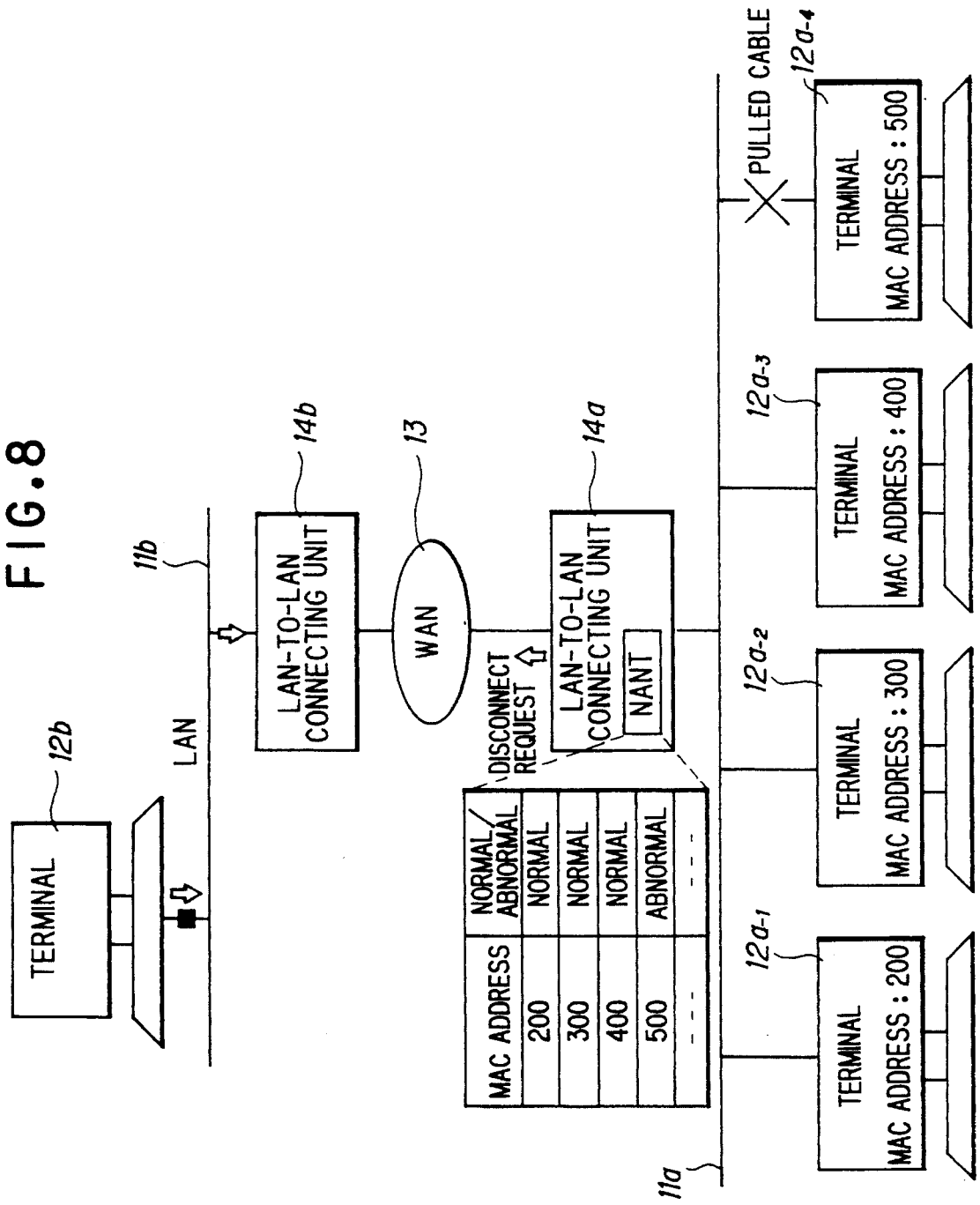
FIG. 8 is a diagram for describing operation when a call is terminated at an abnormal terminal.

FIGS. 7 and 8 are diagrams for describing packet reception control, in which FIG. 7 is a diagram for describing operation when a call is terminated at a normal terminal, and FIG. 8 is a diagram for describing operation when a call is terminated at an abnormal terminal.

① Control when call is terminated at normal terminal

Upon receiving a packet, which has been issued by the terminal 12b, via the LAN-to-LAN connecting unit 14b and WAN 13, the LAN-to-LAN connecting unit 14a extracts the MAC destination address DA contained in this packet. Next, the LAN-to-LAN connecting unit 14a refers to the node-status table NANT to determine whether the terminal having the MAC destination address is capable of receiving data. If the MAC destination address is 200 and the terminal 12a-1 is capable of receiving data (FIG. 7), the LAN-to-LAN connecting unit 14a sends the received data to the LAN 11a. As a result, this data is accepted by the terminal 12a-1.

② Control when call is terminated at abnormal terminal

If the extracted MAC destination address is 500 and the terminal 12a-4 is incapable of receiving data (FIG. 8), the LAN-to-LAN connecting unit 14a does not send reception data to the LAN but immediately sends a line disconnecting request to the WAN 13 to disconnect the line. As a result of this arrangement, the line can be disconnected immediately to lower the cost of line use in a case where reception is impossible.

③ Alternative control when call is terminated at abnormal terminal

In the method of control described in ② above, the line is disconnected if data is incapable of being received. However, an arrangement can be adopted in which a transfer destination is registered in advance and the data is transferred to this destination if the data cannot be received originally.

Figure 9:
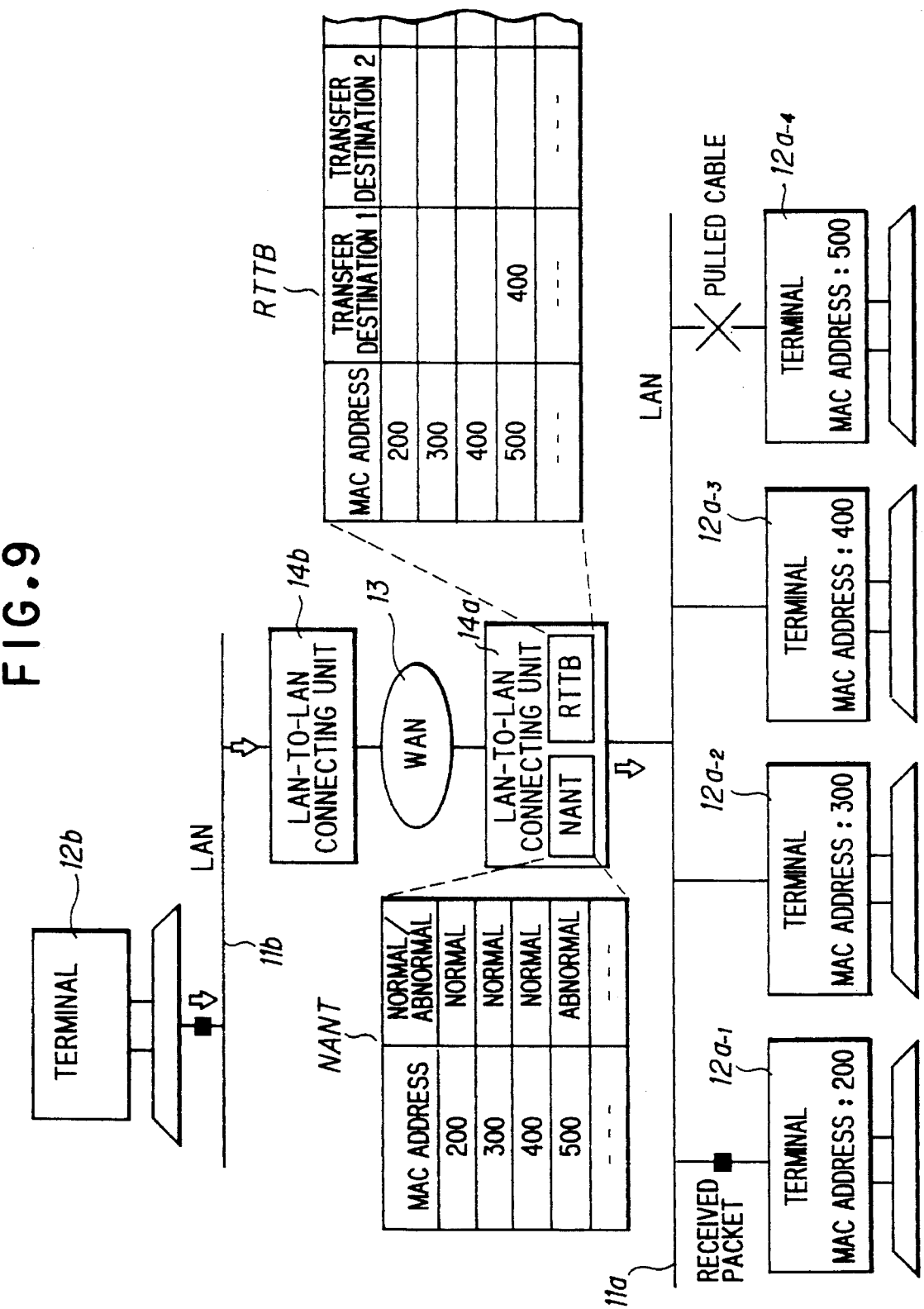
FIG. 9 is a diagram for describing a different operation when a call is terminated at an abnormal terminal.

FIG. 9 is a diagram for describing such transfer control. Here the LAN-to-LAN connecting unit 14a is provided with a routing table RTTB. Destinations to which received data is to be transferred are registered in the routing table RTTB beforehand. In the example of FIG. 9, the terminal 12a-3 at MAC address 400 has been registered as the data transfer destination of terminal 12a-4 at MAC address 500. The registration of this transfer destination is performed by having each terminal generate a packet, which includes a routing-table rewrite command and a transfer-destination MAC address in the information field I, and transmit this packet to the LAN-to-LAN connecting unit 14a via the LAN 11a.

④ Overall control of data reception

When an incoming call is terminated at a terminal incapable of data reception in a situation in which transfer destinations have been registered in the routing table RTTB, the LAN-to-LAN connecting unit 14a obtains a LAN terminal at a transfer destination by referring to the routing table RTTB, rewrites the MAC address contained in the received data to the MAC address of the transfer destination and then sends this address to the LAN. This arrangement is convenient since data can be transferred to a different terminal if the original receiving party is incapable of reception.

Figure 10:
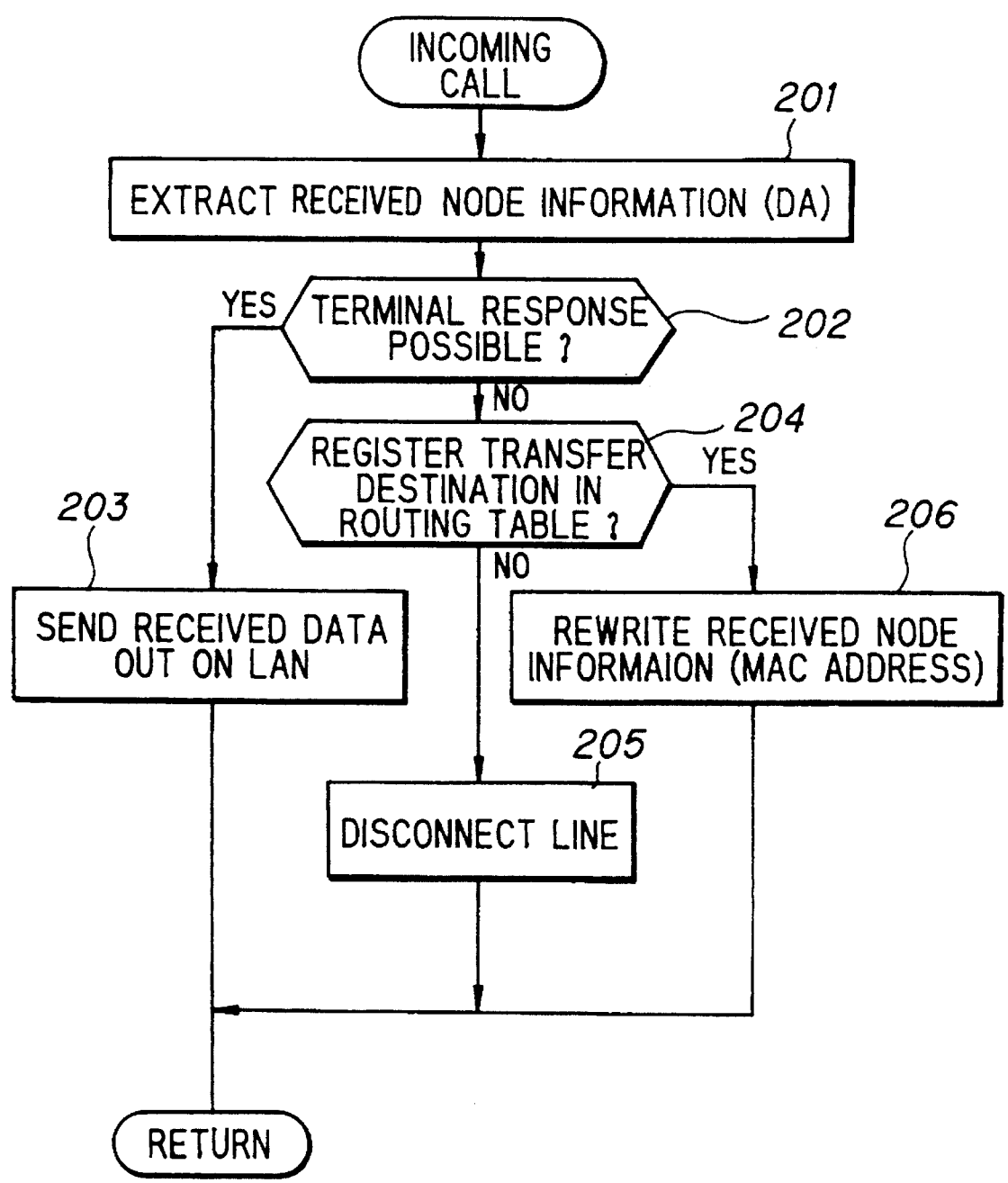
FIG. 10 is a flowchart of control at the time of packet reception.

FIG. 10 is a flowchart of data reception control inclusive of this transfer control.

Upon receiving a packet via the WAN 13, the LAN-to-LAN connecting unit 14a extracts the destination address DA contained in this packet (step 201). Next, the LAN-to-LAN connecting unit 14a refers to the node-status table NANT to determine whether the terminal having this MAC destination address is capable of receiving data (202). If the LAN terminal at this MAC destination address can receive data, then the LAN-to-LAN connecting unit 14a sends the received data to the LAN 11a (step 203). As a result, this data is accepted by the prescribed LAN terminal.

If it is found at step 202 that the terminal at this MAC destination address cannot receive the data, then the LAN-to-LAN connecting unit 14a refers to the routing table RTTB to determine whether a transfer destination corresponding to this MAC destination address has been registered (step 204). If a transfer destination has not been registered, then the LAN-to-LAN connecting unit 14a does not send reception data to the LAN 11a but immediately sends a line disconnecting request to the WAN 13 to disconnect the line (step 205).

On the other hand, if a transfer destination has been registered in the routing table RTTB, then the LAN terminal rewrites the MAC address contained in the received data to the MAC address of the transfer destination and sends this address to the LAN (step 206). As a result, the data is accepted by the LAN terminal at the transfer destination.

(b-5) Functional block constitution of LAN-to-LAN connecting unit

Figure 11:
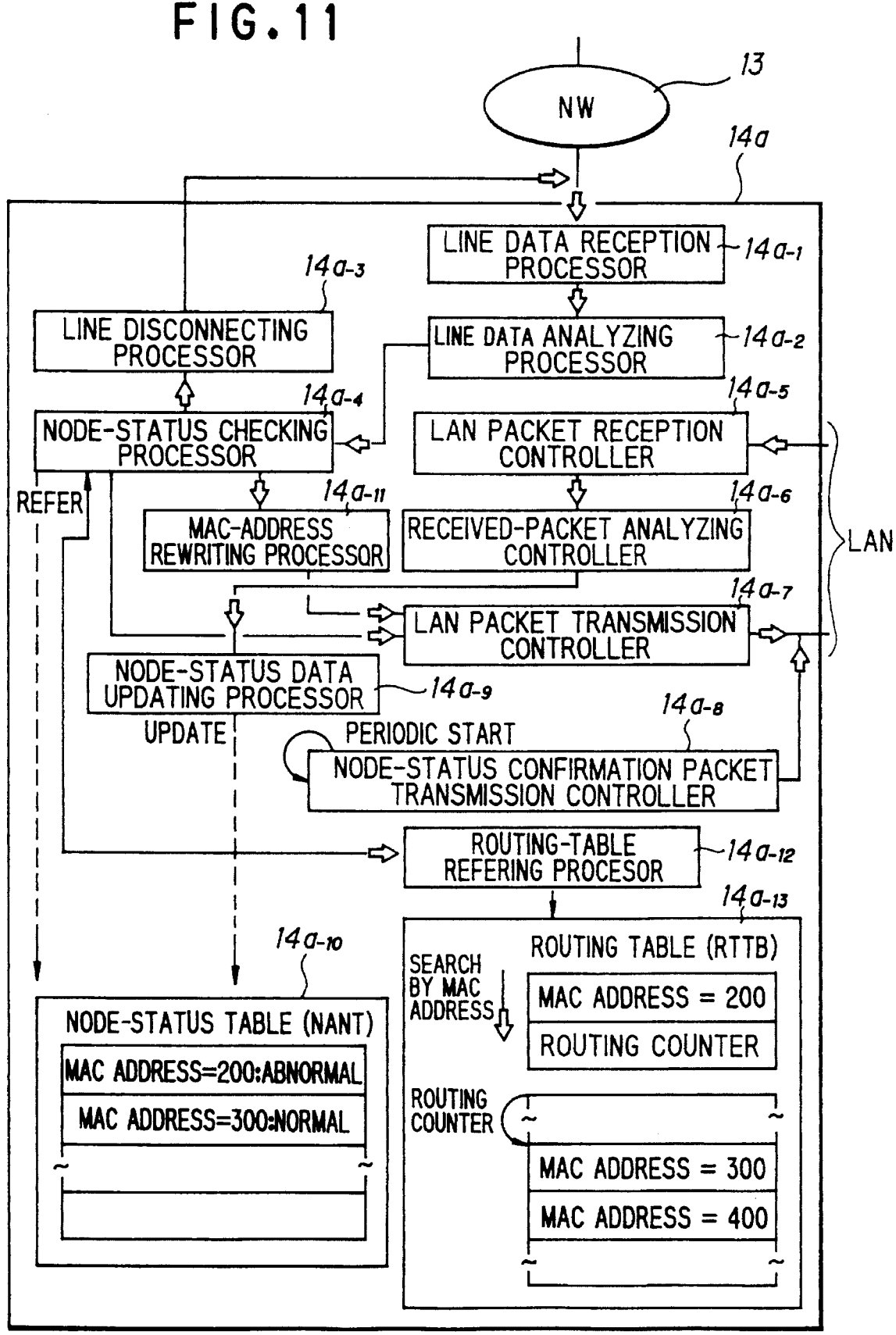
FIG. 11 is a diagram for describing operation of a LAN-to-LAN connecting unit.

FIG. 11 is a diagram for describing the LAN-to-LAN communication method of the invention in a case where the LAN-to-LAN connecting unit 14a is functionally divided into blocks.

Shown in FIG. 11 are a line data reception processor 14a-1, a line data analyzing processor 14a-2, a line disconnecting processor 14a-3, a node-status checking processor 14a-4, a LAN packet reception controller 14a-5, a received-packet analyzing processor 14a-6, a LAN packet transmission controller 14a-7, a node-status confirmation packet transmission controller 14a-8, a node-status data updating processor 14a-9, a node-status table (NANT) 14a-10, a MAC-address rewriting processor 14a-11, a routing-table referring processor 14a-12 and a routing table (RTTB) 14a-13.

① Ascertaining terminal status

The node-status confirmation packet transmission controller 14a-8 periodically sends the node-status confirmation packet to each node (LAN terminal) within its own segment.

Upon receiving the node-status confirmation packet, each node sends a response packet in reply to this packet. After this response packet is received by the LAN packet reception controller 14a-5, the packet is fed into the received-packet analyzing processor 14a-6.

If it has received a response packet in reply to the node-status confirmation packet, the received-packet analyzing processor 14a-6 starts the node-status data updating processor 14a-9 and makes "normal" the corresponding information in the node-status table (NANT) 14a-10 of its own segment. If the response packet is not received, then the corresponding information in the node-status table (NANT) 14a-10 is made "abnormal".

The node-status confirmation packet transmission controller 14a-8 periodically transmits the node-status confirmation packets, the information in the node-status table 14a-10 of its own segment is periodically updated.

② Data transfer when reception is impossible

When line data has been received, the line data reception processor 14a-1 requests that the line data analyzing processor 14a-2 analyze the received data.

The line data analyzing processor 14a-2 extracts reception node data (a MAC destination address) from the received data and requests that the node-status checking processor 14a-4 check the status of this node.

The node-status checking processor 14a-4 extracts the node status from the node-status table 14a-10 of its own segment and sends the received data to the LAN via the LAN packet transmission controller 14a-7 if the terminating node is capable of reception. If the terminating node is incapable of reception, on the other hand, then node-status checking processor 14a-4 starts the routing-table referring processor 14a-12.

The routing-table referring processor 14a-12 searches the routing table (RTTB) 14a-13 using the MAC destination address identified as being incapable of reception and extracts a routing index value that designates the location storing the MAC address of the transfer destination. If the routing-table referring processor 14a-12 obtains the routing index value, it then uses this value to obtain the MAC address of the transfer destination. Thereafter, in order to confirm the status of the terminal having the MAC address of the transfer destination obtained, the node-status checking processor 14a-4 is started.

The node-status checking processor 14a-4 extracts the node status from the node-status table (NANT) 14a-10 of its own segment. In a case where the transfer-destination node is capable of reception, the MAC destination address is rewritten by the MAC-address rewriting processor 14a-11. Thereafter, the received data is transmitted to the LAN via the LAN packet transmission controller 14a-7. Further, the node-status checking processor 14a-4 starts the routing-table referring processor 14a-12 again if the node at the transfer destination is incapable of reception.

③ Line disconnect when reception is impossible

The line data analyzing processor 14a-2 extracts reception node data from the received data and requests that the node-status checking processor 14a-4 check the status of this node.

The node-status checking processor 14a-4 extracts the node status from the node-status table 14a-10 of its own segment and sends the received data to the LAN via the LAN packet transmission controller 14a-7 if the terminating node is capable of reception. If the terminating node is incapable of reception, on the other hand, then node-status checking processor 14a-4 disconnects the line via the line disconnecting processor 14a-3.

(c) Second embodiment of the invention (c-1) Configuration

Figure 12:
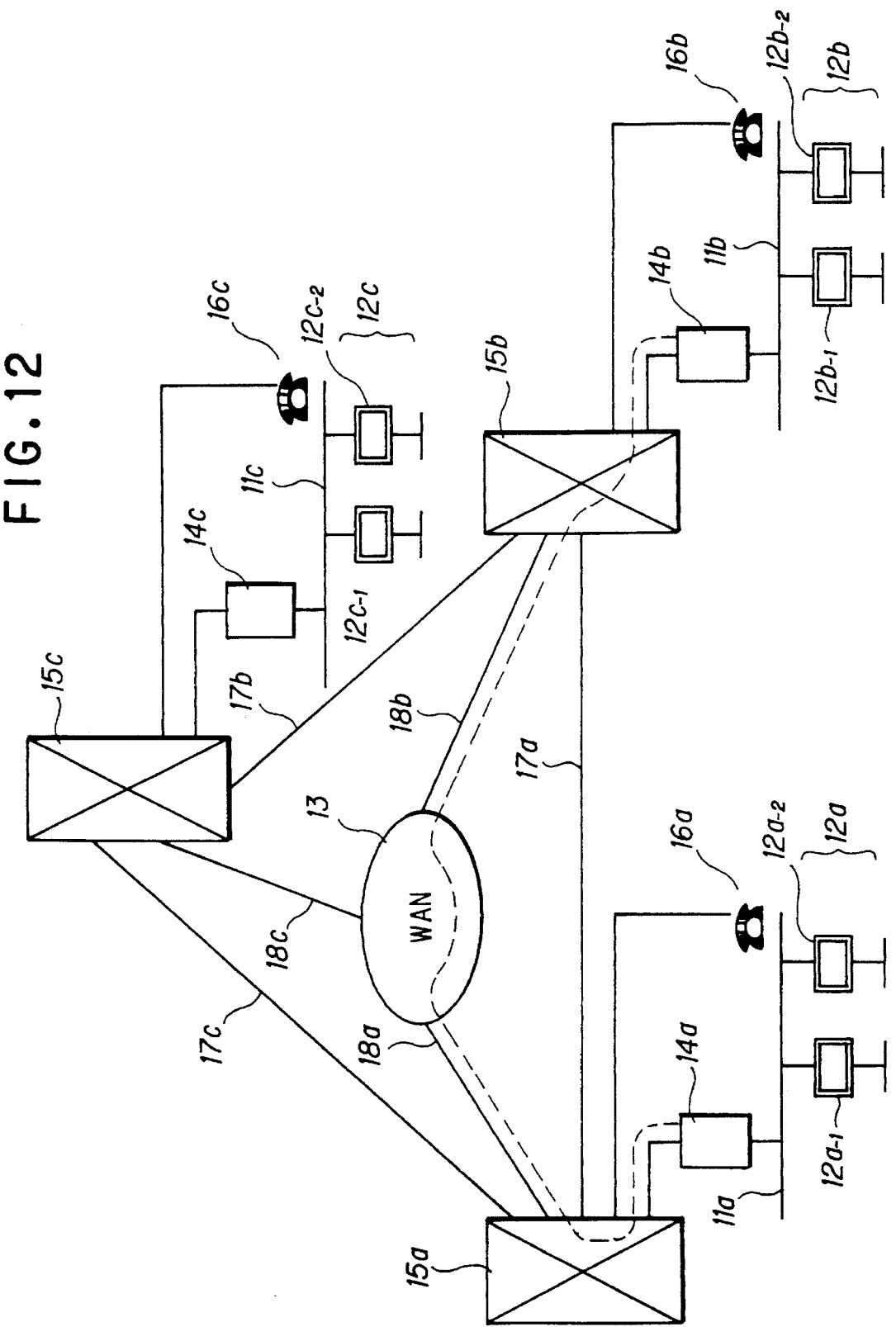
FIG. 12 is a diagram illustrating the overall configuration of a LAN-to-LAN communication system.

FIG. 12 is a diagram illustrating the configuration of a LAN-to-LAN communication system to which a second LAN-to-LAN communication method of the invention can be applied. The system includes LANs 11a, 11b, 11c such as Ethernets, LAN terminals 12a, 12b, 12c accommodated in the respective LANs 11a, 11b, 11c, a WAN 13, such as a telephone network, data switching network, ISDN or leased circuit, LAN-to-LAN connecting units 14a, 14b, 14c such as bridges or routers, electronic exchanges 15a, 15b, 15c, telephones 16a, 16b, 16c installed on the same floor as the LAN terminals 12a, 12b, 12c connected to the LAN 11a, trunk lines 17a, 17b, 17c and public telephone lines 18a, 18b, 18c. The LAN-to-LAN connecting units 14a~14c do not have a function for identifying the telephone number of another party using a network address or MAC address contained in LAN data. However, each connecting unit does possess ① a filtering function; ② a function for issuing a connection request to the electronic exchanges 15a~15c when a frame accepted by filtering processing is sent to another party via an electronic exchange or the WAN; ③ a function for transmitting a packet after a connection is established; and ④ a function for transmitting received data sent thereto to the LANs 11a~11c.

(c-2) General operation

The electronic exchange 15a has a memory in which, say, the LAN-to-LAN Connecting unit 14a and the LAN-to-LAN connecting unit 14b of the other party are stored in 1:1 correspondence. When the electronic exchange 15a receives a connection request from the LAN-to-LAN connecting unit 14a, it refers to the information stored in its memory, executes call processing to connect the LAN-to-LAN connecting unit 14a to the LAN-to-LAN connecting unit 14b and then connects the LAN-to-LAN connecting unit 14a to the LAN-to-LAN connecting unit 14b to allow LAN-to-LAN communication.

Further, the telephone 16a issues a request for changing the party (14b) of the LAN-to-LAN connecting unit 14a to the LAN-to-LAN connecting unit 14c. When such a change request is issued, the electronic exchange 15a stores information indicative of the LAN-to-LAN connecting unit 14c, which is the destination after the change, in its memory in correlation with the LAN-to-LAN connecting unit 14a. When a connection request is subsequently received from the LAN-to-LAN connecting unit 14c, the electronic exchange 15a refers to the stored information, executes call-control processing to connect the LAN-to-LAN connecting unit 14a to the destination LAN-to-LAN connecting unit 14c after the change, connects the LAN-to-LAN connecting units 14a, 14c together and allows LAN-to-LAN communication.

In accordance with this arrangement, LAN-to-LAN communication can be performed by effecting a connection to a registered LAN-to-LAN connecting unit only when there is a request for LAN-to-LAN communication. In addition, the above-mentioned registered LAN-to-LAN connecting unit can be changed by a request from a device such as a telephone, after which LAN-to-LAN communication can be carried out with the changed LAN-to-LAN connecting unit. As a result, LAN-to-LAN communication can be performed upon changing the destination LAN through a simple arrangement and at little line-use cost.

Further, by registering a LAN-to-LAN connecting unit that is transfer destination in correlation with a LAN-to-LAN connecting unit of another party, a LAN-to-LAN connecting unit that has issued a connection request can be connected to the LAN-to-LAN connecting unit at the transfer destination to make LAN-to-LAN communication possible. Furthermore, by registering a LAN-to-LAN connecting unit that is the destination of a transfer and a transfer time period so as to correspond to another party's LAN-to-LAN connecting unit, the LAN-to-LAN connecting unit that has issued a connection request can be connected to the LAN-to-LAN connecting unit that is the transfer destination for a time limited to the transfer time period to make LAN-to-LAN communication possible during this time period.

(c-3) Construction of electronic exchange

Figure 13:
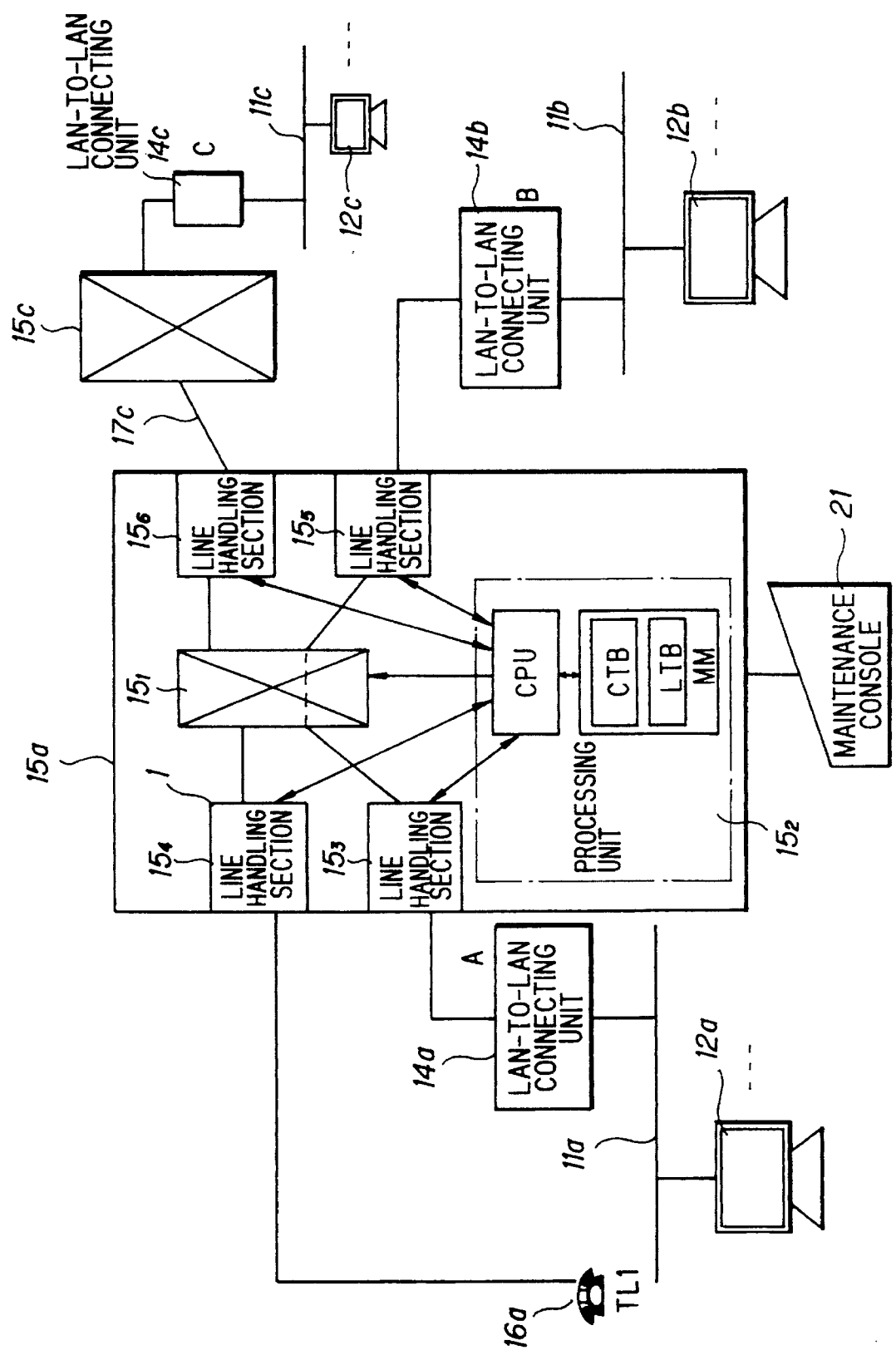
FIG. 13 is a diagram of an electronic exchange.

FIG. 13 is a diagram showing the construction of an electronic exchange for practicing the second LAN-to-LAN communication method of the present invention. Portions identical with those shown in FIG. 12 are designated by like reference characters. In addition, elements not necessary for descriptive purposes are deleted. This arrangement differs from that of FIG. 12 in that a maintenance console 21 is provided and in that the internal construction of the electronic exchange 15a is clearly shown.

The electronic exchange 15a includes a network section $15_1$ for switching data from a line, a processing unit $15_2$, a line handling section $15_3$ accommodating the LAN-to-LAN connecting unit 14a, a line handling section $15_4$ accommodating the telephone 16a, and line handling sections $15_5$, $15_6$ accommodating lines for connection to the LANs of other parties.

The processing unit $15_2$, which instructs the network $15_1$ to perform switching in response to a connection request from each of the line handling sections, has a processor CPU and a memory MM. The memory MM is provided with a connection-destination table CTB and a LAN-to-LAN connecting unit table LTB. As shown in FIG. 14, the connection-destination table CTB stores the correlation among ① telephones, ② the accommodating locations (or telephone numbers) of the LAN-to-LAN connecting units corresponding to these telephones and ③ the accommodating locations (or tele-phone numbers) of LAN-to-LAN connecting units which are the connection destinations of the above-mentioned LAN-to-LAN connecting units. As shown in FIG. 14, the LAN-to-LAN connecting unit table LTB stores the correlation among logical numbers (not always necessary) of LAN-to-LAN connecting units, the accommodating locations of these LAN-to-LAN connecting units and their telephone numbers. The LAN-to-LAN connecting unit table LTB is registered in the memory MM using the maintenance console 21.

(c-4) Operation of electronic exchange when connection request is issued

In a case where the LAN-to-LAN connecting unit 14b (telephone number: $d_b d_b d_b d_b d_b d_b$) has been registered in the connection-destination table CTB as the connection destination of LAN-to-LAN connecting unit 14a (telephone number $d_a d_a d_a d_a d_a d_a$), the LAN-to-LAN connecting unit 14a accepts a frame when the frame is sent from the LAN terminal 12a to the LAN terminal 12b and then issues a connection request to the electronic exchange 15a. The connection request is transmitted to the processing unit $15_2$ via the line handling section $15_3$.

In response to the connection request, the processor CPU refers to the connection-destination table CTB and the LAN-to-LAN connecting unit table LTB, obtains the accommodating position (or telephone number $d_b d_b d_b d_b d_b d_b$) of the LAN-to-LAN connecting unit 14b which is the connection destination of the LAN-to-LAN connecting unit 14a that issued the connection request, and controls the network section $15_1$ to connect the LAN-to-LAN connecting unit 14a and the LAN-to-LAN connecting unit 14b.

When the connection between the LAN-to-LAN connecting unit 14a and the LAN-to-LAN connecting unit 14b has been established, the LAN-to-LAN connecting unit 14a starts transmission of a frame from the LAN terminal 12a and sends the frame to the LAN-to-LAN connecting unit 14b, which is the connection destination, via the electronic exchange 15a. The LAN-to-LAN connecting unit 14b sends the received frame to the LAN 11b, and the LAN terminal 12b accepts the frame.

Thus, when any LAN terminal 12a accommodated by the LAN 11a sends a frame to any LAN terminal 12b accommodated by the LAN 11b, the electronic exchange 15a connects the LAN-to-LAN connecting units 14a, 14b and allows LAN-to-LAN communication.

(c-5) Control for changing connection destination

Changing the connection destination of the LAN-to-LAN connecting unit 14a is performed in the manner set forth below. FIG. 16 is a flowchart of control for changing a connection destination, and FIG. 17 is a diagram for describing control for changing a connection destination.

In order to change the connection destination of the LAN-to-LAN connecting unit 14a, the telephone (TL1) corresponding to the LAN-to-LAN connecting unit 14a issues a connection-change request to the electronic exchange 15a. The connection-change request is designated by a number, which is a combination of a special number a and the other party's number, as generally used in electronic exchange services. However, if the telephone is one with multiple functions, a service button for changing the connection destination can be provided and this button can be pressed instead of entering a special number. Further, the other party's number may be the telephone number of the LAN-to-LAN connecting unit or a logical number that is specially defined (step 301).

When the combination of the special number a and the other party's number (assumed to be the logical number aaaa) is designated by the telephone 16a, the number combination is transmitted to the processing unit $15_2$ via the line handling section $15_4$. The processor CPU determines from the special number a that the number combination is a request to change the connection destination of the LAN-to-LAN connecting unit 14a and obtains the other party's accommodating location or telephone number $d_c d_c d_c d_c d_c d_c$ from the table TBL based upon the other party's number (logical number aaaa) (step 302). Next, the processor CPU changes the fixed connection destination $d_b d_b d_b d_b d_b d_b$ corresponding to telephone TL1 (or LAN-to-LAN connecting unit 14a) in the connection-destination table CTB to the other party's accommodating location or telephone number $d_c d_c d_c d_c d_c d_c$ obtained above (step 303). For example, if the change is made to LAN-to-LAN connecting unit 14c, the fixed connection destination is updated to the accommodating location (or telephone number $d_c d_c d_c d_c d_c d_c$) of the LAN-to-LAN connecting unit 14c.

Thereafter, if the connection request is received from LAN-to-LAN connecting unit 14a, the electronic exchange 15a performs call processing control so as to connect this LAN-to-LAN connecting unit 14a to the LAN-to-LAN connecting unit 14c to which the change has been made.

Thus, it is possible to change freely the connection destination of a LAN-to-LAN connecting unit. However, since the connected line is changed suddenly, another party will be cut off suddenly if the other party is communicating at this time. In order to prevent this problem, it is so arranged that the use of the line handling section $15_3$ is checked and the change in connection is allowed only when it is determined that the line handling section $15_3$ is not being used.

Control for changing a connection as set forth above can be applied also to a LAN-to-LAN connecting unit which decides a connection destination based on a destination MAC address or network address. In such case the connection destination can be changed without changing the data possessed by the LAN-to-LAN connecting unit.

(c-6) Transfer control

By previously registering a LAN-to-LAN connecting unit that is a transfer destination so as to correspond to the LAN-to-LAN connecting unit of the other party, a LAN-to-LAN connecting unit that has issued a connection request can be connected to the LAN-to-LAN connecting unit that is the transfer destination, thereby making communication between the two LANs possible.

FIG. 18 is a diagram for describing such transfer control. Here a section for registering a transfer-destination number has been added to the LAN-to-LAN connecting unit table LTB. In order to register the transfer destination of a LAN-to-LAN connecting unit, a prescribed telephone issues a transfer-destination registration request to the electronic exchange 15a. The transfer-destination registration request is designated by a number, which is a combination of a special number b, the other party's number and the transfer-destination number, as generally used in electronic exchange services. However, if the telephone is one with multiple functions, a service button for registering a transfer destination can be provided and this button can be pressed instead of entering a special number. Further, the other party's number may be the telephone number of the LAN-to-LAN connecting unit or a logical number that is specially defined.

When the combination of the special number b, the other party's number (assumed to be the logical number aaaa) and the transfer-destination number ($d_2d_2d_2d_2d_2d_2$) is designated by the telephone, the number combination is transmitted to the processing unit $15_2$. The processor CPU determines from the special number b that the number combination is a request to register a transfer destination and registers the transfer-destination number $d_2d_2d_2d_2d_2d_2$, inputted above, in the transfer-destination number section corresponding to the logical number (aaaa) in the table LTB.

Figure 19:
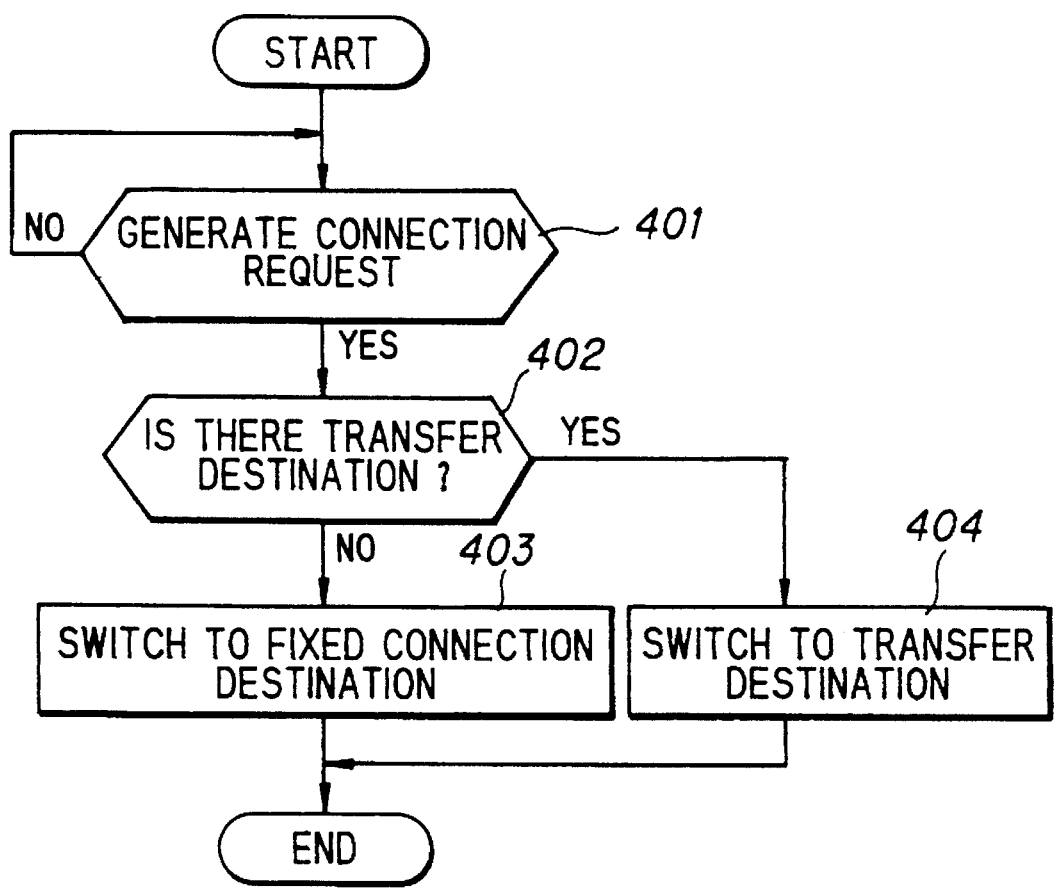
FIG. 19 is a flowchart of connection control for when a connection request is issued.
Figure 21:
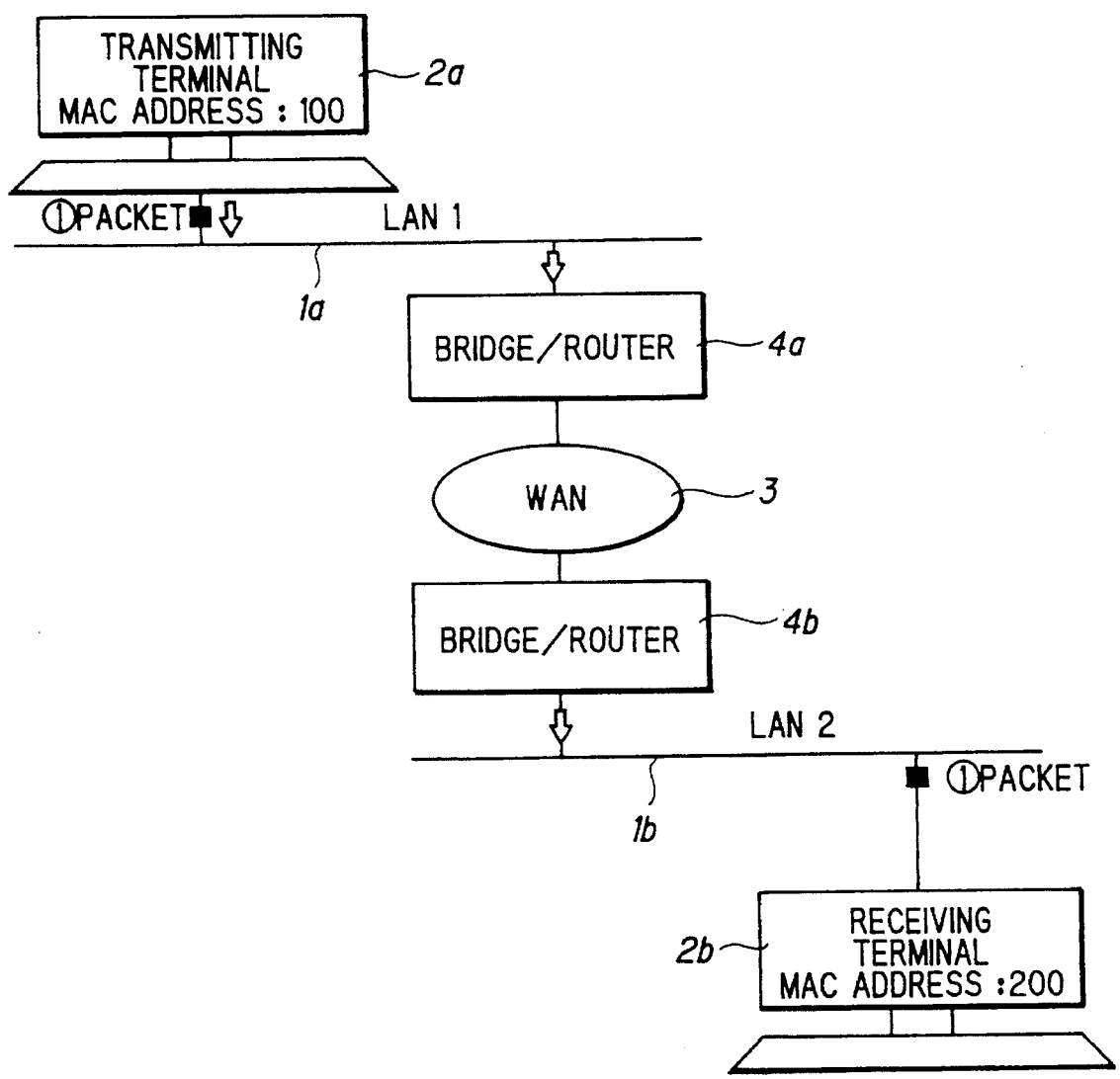
FIG. 21 is a diagram showing the configuration of a LAN-to-LAN communication system.

FIG. 19 is a flowchart of transfer control in a case where a transfer-destination number has been registered. When the LAN-to-LAN connecting unit 14a issues a connection request (step 401) under conditions in which a transfer-destination number has been registered, as shown in FIG. 18, the processor CPU obtains the accommodating location of telephone number $d_cd_cd_cd_cd_cd_c$ of the fixed connection destination from the connection-destination table CTB and then refers to the table LTB to determine whether a transfer destination has been registered in correlation with the telephone number $d_cd_cd_cd_cd_cd_c$ (step 402).

If a transfer-destination number has not been registered, the LAN-to-LAN connecting unit 14a is connected to the LAN-to-LAN connecting unit having the telephone number $d_cd_cd_cd_cd_cd_c$, namely the fixed connection destination (step 403). However, if the telephone number $d_2d_2d_2d_2d_2d_2$ has been registered, then call processing control is executed to connect the LAN-to-LAN connecting unit 14a to the LAN-to-LAN connecting unit having the telephone number $d_2d_2d_2d_2d_2d_2$ (step 404).

The transfer destination is canceled by using a telephone to enter the combination of a special number c and the other party's number (logical number). When the special number c is entered, the processor CPU clears the transfer-destination number registered in the table LTB to correspond to the other party's number (logical number aaaa) and cancels the transfer. Thus, the transfer control function is useful when it is desired to change the connected party temporarily as at night or on special days such as holidays.

In the foregoing, a transfer is made to a registered transferred destination irrespective of the time period. However, an arrangement can be adopted in which a time period for transfer is registered beforehand and the transfer is performed only at times which fall within this time period. For example, in a case where it is desired to effect a connection at night or on holidays, registering the time period during which a transfer can be performed is convenient because the transfer destination need not be registered on each occasion.

Accordingly, the number of the transfer destination and the transfer time period is designated using the maintenance console 21 or telephone and registering the transfer-destination number and transfer time period (designated starting time and designated end time) in the LAN-to-LAN connecting unit table LTB, a shown in FIG. 20. In a case where such a transfer time period has been registered, step 404 of FIG. 19 will be composed of the following steps: ① a step of judging whether the current time falls within the transfer time period; ② a step of effecting connection to the fixed connection destination without a transfer if the current time does not fall within the transfer time period; and ③ a step of effecting connection to the transfer destination if the current time falls within the transfer time period.

Though a case has been described above in which a change in connection destination or registration of transfer destination is entered from the telephone, a similar service can be acquired by entering the foregoing from the maintenance console or from the LAN-to-LAN connecting unit itself.

Thus, as set forth above, a LAN-to-LAN connecting unit sends data to LAN terminals under command in order to confirm the status of these terminals. The LAN-to-LAN connecting unit identifies and stores information indicating whether a LAN terminal is capable or incapable of reception depending upon whether the terminal responds to the confirmation data. In a case where an incoming call has been terminated at a prescribed LAN terminal under these conditions, the LAN-to-LAN connecting unit determines whether this LAN terminal is capable of reception by referring to the stored information. In a case where this LAN terminal is capable of reception, the LAN-to-LAN connecting unit receives the data sent from the other party's LAN terminal and transmits this data to the LAN. In a case where the prescribed LAN terminal is incapable of reception, the connecting unit immediately disconnects the line. As a result, the present invention makes it possible to lower the cost of line use.

Further, destinations for transfer of received data for a case in which reception is impossible are registered beforehand in a table. If an incoming call has been terminated at a prescribed LAN terminal, the LAN-to-LAN connecting unit obtains a LAN terminal which is a transfer destination by referring to the table when the prescribed LAN terminal is incapable of reception, rewrites a MAC address contained in the received data to a MAC address of the transfer destination and then sends this rewritten MAC address to a LAN terminal at this transfer destination. As a result, the present invention makes it possible to transfer data to a different terminal if the original destination for reception is incapable of reception.

Furthermore, a LAN-to-LAN connecting unit and a destination LAN-to-LAN connecting unit are stored in a memory of an electronic exchange in 1:1 correspondence. When a connection request is generated by the first-mentioned LAN-to-LAN connecting unit, the electronic exchange fixedly connects this LAN-to-LAN connecting unit to the corresponding destination LAN-to-LAN connecting unit and allows LAN-to-LAN communication to take place. When an external device such as a telephone issues a change request for changing the destination LAN-to-LAN connecting unit, the electronic exchange stores the destination LAN-to-LAN connecting unit to which the change is to be made in the memory so as to correspond to the first-mentioned LAN-to-LAN connecting unit. When there is a subsequent connection request from the first-mentioned LAN-to-LAN connecting unit, the electronic exchange connects this LAN-to-LAN connecting unit to the destination LAN-to-LAN connecting unit resulting from the change and allows LAN-to-LAN communication between the two LANs. As a result, the present invention makes it possible to select a desired party at any time that it is desired to communicate even in the case of a single-function, fixed-connection bridge or router. In other words, a LAN that is the destination of a connection can be changed and communication made possible with this LAN through a simply constructed apparatus and at low cost for line use.

Further, according to the present invention, a LAN-to-LAN connecting unit that is the destination of a transfer is registered in advance so as to correspond to the other party's LAN-to-LAN connecting unit. As a result, the LAN-to-LAN connecting unit that has issued a connection request can be connected to the LAN-to-LAN connecting unit that is the transfer destination to make LAN-to-LAN communication possible.

Furthermore, according to the present invention, a LAN-to-LAN connecting unit that is the destination of a transfer and a transfer time period are registered so as to correspond to the other party's LAN-to-LAN connecting unit. As a result, the LAN-to-LAN connecting unit that has issued a connection request can be connected to the transfer-destination LAN-to-LAN connecting unit only at times that fall within the transfer time period to make LAN-to-LAN communication possible within this time period.

As many apparently widely different embodiments of the present invention can be made without departing from the spirit and scope thereof, it is to be understood that the invention is not limited to the specific embodiments thereof except as defined in the appended claims.

What is claimed is:

1. A LAN-to-LAN communication method in which LA-to-LAN connecting units are provided between LANs and a WAN and LAN-to-LAN communication is performed by the LAN-to-LAN connecting unit via the WAN, the method comprising the steps of:

sending confirmation data from a LAN-to-LAN connecting unit to LAN terminals, which are under the command of said LAN-to-LAN connecting unit, in order to confirm the status of each LAN terminal;

identifying and storing information indicating whether a LAN terminal is in a reception possible/impossible state depending upon whether or not said LAN terminal responds to the confirmation data;

in a case where an incoming call from another party has been terminated at a prescribed LAN terminal, determining whether said prescribed LAN terminal is in the reception-possible state by referring to the stored information;

receiving data sent from said another party and sending said data to said prescribed LAN terminal in a case where said prescribed LAN terminal is in the reception-possible state;

disconnecting a line between said another party and said LAN-to-LAN connecting unit in a case where said prescribed LAN terminal is in the reception-impossible state;

in a case where an incoming call has been terminated at the prescribed LAN terminal, obtaining a LAN terminal which is a transfer destination by referring to the table when said prescribed LAN terminal is in the reception-impossible state; and rewriting a MAC address contained in the received data to a MAC address of the transfer destination and then sending said MAC address to a LAN terminal at said transfer destination.

2. A LAN-to-LAN communication method in which LAN-to-LAN connecting units are provided between LANs and an electronic exchange and LAN-to-LAN communication is performed by the LAN-to-LAN connecting units via the electronic exchange, the method comprising the steps of:

previously registering a corresponding relationship between a LAN-to-LAN connecting unit and a destination LAN-to-LAN connecting unit in a memory of said electronic exchange in 1:1 correspondence;

when a connection request is received from a prescribed LAN-to-LAN connecting unit, causing the electronic exchange to obtain a destination LAN-to-LAN connecting unit which corresponds to said prescribed LAN-to-LAN connecting unit;

causing the electronic exchange to connect said prescribed LAN-to-LAN connecting unit that issued the connection request to the destination LAN-to-LAN connecting unit obtained and perform LAN-to-LAN communication;

when an external device issues a change request for changing the destination LAN-to-LAN connecting unit in said corresponding relationship registered in said memory to another destination LAN-to-LAN connecting unit, causing the electronic exchange to update the corresponding relationship in response to the change request; and when a subsequent connection request is received from said prescribed LAN-to-LAN connecting unit, causing the electronic exchange to connect said prescribed LAN-to-LAN connecting unit to said another destination LAN-to-LAN connecting unit and perform LAN-to-LAN communication.

3. The method according to claim 2, further comprising the steps of:

previously registering, by an external device, a transfer-destination LAN-to-LAN connecting unit in the memory of the electronic exchange in correspondence to said destination LAN-to-LAN connecting unit; and when a connection request is received from a prescribed LAN-to-LAN connecting unit, causing the electronic exchange to connect said prescribed LAN-to-LAN connecting unit to the transfer-destination LAN-to-LAN connecting unit and perform LAN-to-LAN communication.

4. The method according to claim 2, further comprising the steps of:

previously registering, by an external device, a transfer-destination LAN-to-LAN connecting unit and a transfer time period in the memory of the electronic exchange in correspondence to said destination LAN-to-LAN connecting unit;

when a connection request is received from a prescribed LAN-to-LAN connecting unit, causing the electronic exchange to determine whether a time at which the connection request was issued falls within said transfer time period; and causing the electronic exchange to connect said prescribed LAN-to-LAN connecting unit that issued the connection request to the transfer-destination LAN-to-LAN connecting unit and perform LAN-to-LAN communication if the time at which the connection request was issued falls within said transfer time period.

5. The method according to claim 2, wherein said external device is a telephone connected to the electronic exchange or another LAN-to-LAN connecting unit connected to the electronic exchange.

6. A LAN-to-LAN connecting unit for interconnecting LANs and performing LAN-to-LAN communication via a WAN, comprising:

confirmation-data sending means for sending confirmation data to LAN terminals, which are under command, in order to confirm the status of each LAN terminal;

means for identifying and storing, in a memory, information indicating whether a LAN terminal is in a reception possible/impossible state depending upon whether or not said LAN terminal responds to the confirmation data;

means for determining whether a prescribed LAN terminal is in the reception-possible state by referring to the stored information in a case where an incoming call from another party has been terminated at said prescribed LAN terminal;

means for receiving data sent from said another party and sending said data to said prescribed LAN in a case where said prescribed LAN terminal is in the reception-possible state;

a routing table in which LAN terminals which are transfer-destinations of received data have been registered;

means for obtaining a LAN terminal which is a transfer destination by referring to said routing table if, when an incoming call has been terminated at a prescribed LAN terminal, said prescribed LAN terminal is in the reception-impossible state; and means for rewriting a MAC address contained in the received data to a MAC address of the LAN terminal of the transfer destination and then sending said MAC address to a LAN terminal at said transfer destination.

* * * * *